(12) United States Patent
White et al.

(10) Patent No.: US 7,273,082 B2
(45) Date of Patent: Sep. 25, 2007

(54) TIRE INFLATION SYSTEM APPARATUS AND METHOD

(75) Inventors: Jay D. White, Massillon, OH (US); Richard R. Steiner, N. Canton, OH (US); Jesse W. Cervantez, Navarre, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 126 days.

(21) Appl. No.: 10/827,040

(22) Filed: Apr. 19, 2004

(65) Prior Publication Data

US 2005/0194080 A1  Sep. 8, 2005

Related U.S. Application Data

(63) Continuation-in-part of application No. 10/794,942, filed on Mar. 5, 2004, now abandoned.

(51) Int. Cl.
*B60C 29/00* (2006.01)
*B60C 23/02* (2006.01)

(52) U.S. Cl. ............... 152/417; 152/415; 73/146.3

(58) Field of Classification Search ........ 152/415–417; 73/146.2, 146.3
See application file for complete search history.

(56) References Cited

U.S. PATENT DOCUMENTS

| | | | |
|---|---|---|---|
| 2,107,405 A | 2/1938 | Williams | |
| 2,780,267 A | 2/1957 | Richards et al. | |
| 3,691,524 A | 9/1972 | Frost et al. | |
| 4,498,515 A | 2/1985 | Holtzhauser et al. | |
| 4,603,890 A | 8/1986 | Huppee | |
| 4,619,303 A | 10/1986 | Bryan et al. | |

(Continued)

FOREIGN PATENT DOCUMENTS

EP  0343990 A2  11/1989

(Continued)

OTHER PUBLICATIONS

Parker Hannifin Corporation, 2002, brochure entitled "FlexiSeal Spring Energized Polon Polymer Seals". Entire document.

(Continued)

*Primary Examiner*—Jason R. Bellinger
(74) *Attorney, Agent, or Firm*—Buckingham, Doolittle & Burroughs, LLP.; David P. Dureska; Edward T. Kennedy

(57) ABSTRACT

A tire inflation system includes an air supply source in selective fluid communication with a tire via a pneumatic conduit. A method of inflating the system includes providing a tire pressure retention valve in the pneumatic conduit adjacent to the tire. An inflation pressure of the tire is determined with a step-up procedure, in which air bursts are communicated from the air supply source to a portion of the pneumatic conduit between the air supply source and the tire pressure retention valve. The volume of at least one selected communicated air burst is related to a volume of a section of the conduit. The tire is inflated with an extended-pulse procedure, in which extended bursts of air are communicated from the air supply source to the tire. A shut-down sequence is performed once a predetermined target inflation pressure in the tire is reached.

21 Claims, 21 Drawing Sheets

U.S. PATENT DOCUMENTS

| | | | |
|---|---|---|---|
| 4,640,331 A | | 2/1987 | Braun et al. |
| 4,724,879 A | | 2/1988 | Schultz et al. |
| 4,744,399 A | * | 5/1988 | Magnuson et al. ......... 152/417 |
| 4,763,709 A | * | 8/1988 | Scholer ...................... 152/416 |
| 4,782,879 A | | 11/1988 | Le Chatelier et al. |
| 4,860,579 A | | 8/1989 | Beverly |
| 4,875,719 A | | 10/1989 | Mylett |
| 4,883,106 A | | 11/1989 | Schultz et al. |
| 4,898,216 A | | 2/1990 | Schultz et al. |
| 4,924,926 A | | 5/1990 | Schultz et al. |
| 5,121,774 A | | 6/1992 | Hicks et al. |
| 5,179,981 A | | 1/1993 | Hicks et al. |
| 5,180,456 A | | 1/1993 | Schultz et al. |
| 5,244,027 A | | 9/1993 | Freigang |
| 5,249,609 A | * | 10/1993 | Walker et al. ................ 141/4 |
| 5,253,687 A | | 10/1993 | Beverly et al. |
| 5,273,064 A | | 12/1993 | Beverly et al. |
| 5,291,776 A | * | 3/1994 | Mallison .................... 73/146 |
| 5,313,995 A | | 5/1994 | Schultz |
| 5,516,379 A | | 5/1996 | Schultz |
| 5,524,481 A | | 6/1996 | Claussen et al. |
| 5,584,949 A | | 12/1996 | Ingram |
| 5,674,332 A | | 10/1997 | Battocchio |
| 5,769,979 A | | 6/1998 | Naedler |
| 6,098,682 A | * | 8/2000 | Kis ............................ 152/415 |
| 6,131,631 A | | 10/2000 | Bradley et al. |
| 6,145,559 A | | 11/2000 | Ingram, II |
| 6,153,030 A | | 11/2000 | Hanisch et al. |
| 6,182,727 B1 | | 2/2001 | Beesley |
| 6,244,316 B1 | | 6/2001 | Naedler |
| 6,246,317 B1 | | 6/2001 | Pickornik et al. |
| 6,283,186 B1 | | 9/2001 | Krisher |
| 6,325,123 B1 | | 12/2001 | Gao et al. |
| 6,425,427 B1 | * | 7/2002 | Stech ......................... 152/417 |
| 6,484,774 B1 | | 11/2002 | Naedler |
| 6,561,017 B1 | | 5/2003 | Claussen et al. |
| 6,561,550 B1 | | 5/2003 | Kiraz |
| 6,585,019 B1 | * | 7/2003 | Ingram ....................... 152/417 |
| 6,604,414 B1 | | 8/2003 | Claussen et al. |
| 6,666,078 B1 | | 12/2003 | Claussen et al. |
| 6,698,482 B2 | | 3/2004 | Hennig et al. |
| 2003/0192372 A1 | | 10/2003 | Claussen et al. |
| 2004/0035196 A1 | | 2/2004 | Claussen et al. |

FOREIGN PATENT DOCUMENTS

| | | |
|---|---|---|
| EP | 0531069 A2 | 3/1993 |
| WO | WO03/089259 A1 | 10/2003 |

OTHER PUBLICATIONS

Dana Corporation, 2001, manual entitled "Tire Maintenance System Installation and Troubleshooting," Version 3.0. Entire document.

Reineke Company, Inc., Pressure Guard™ Tire Inflation Systems, 2003.

\* cited by examiner

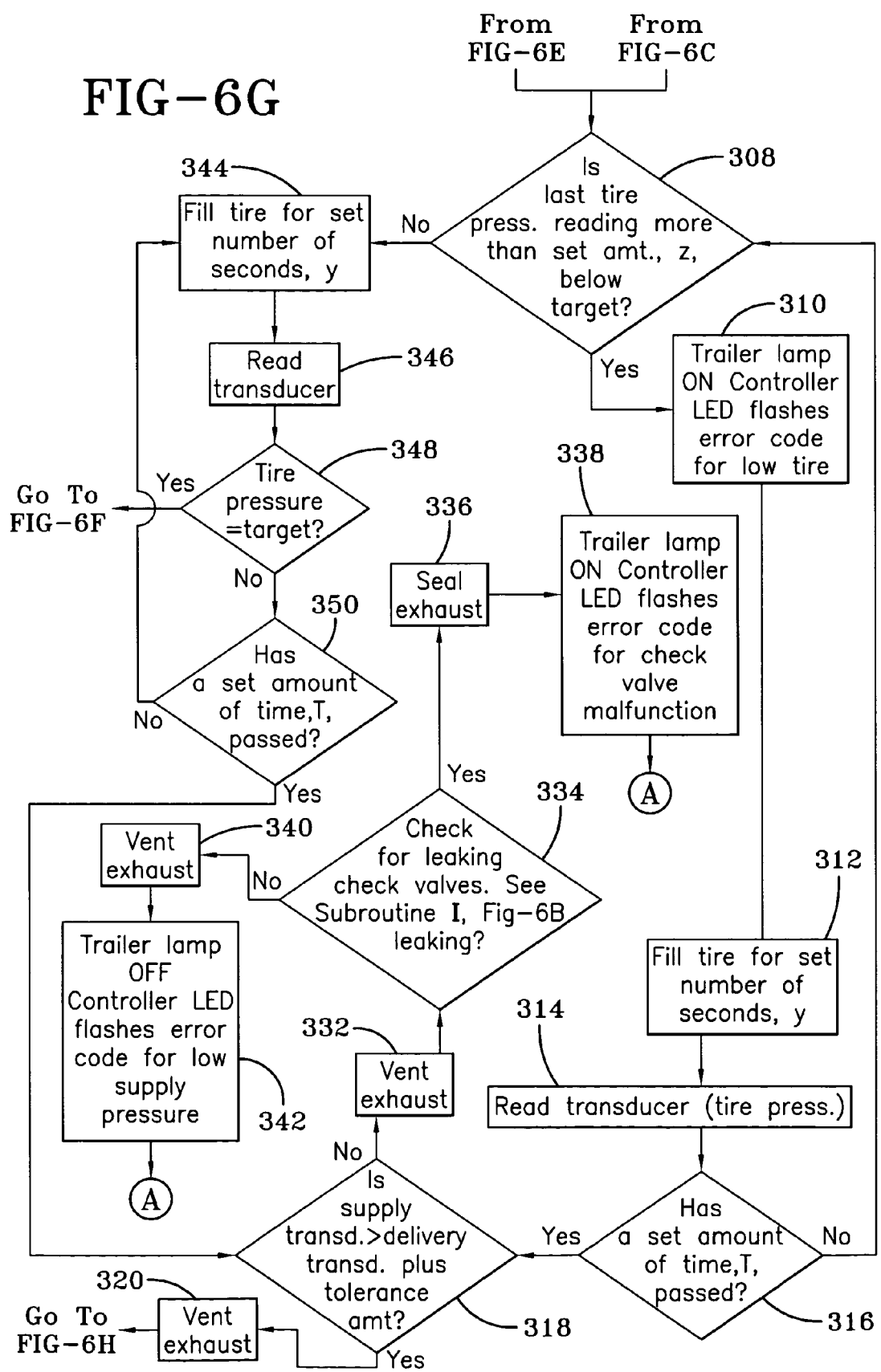

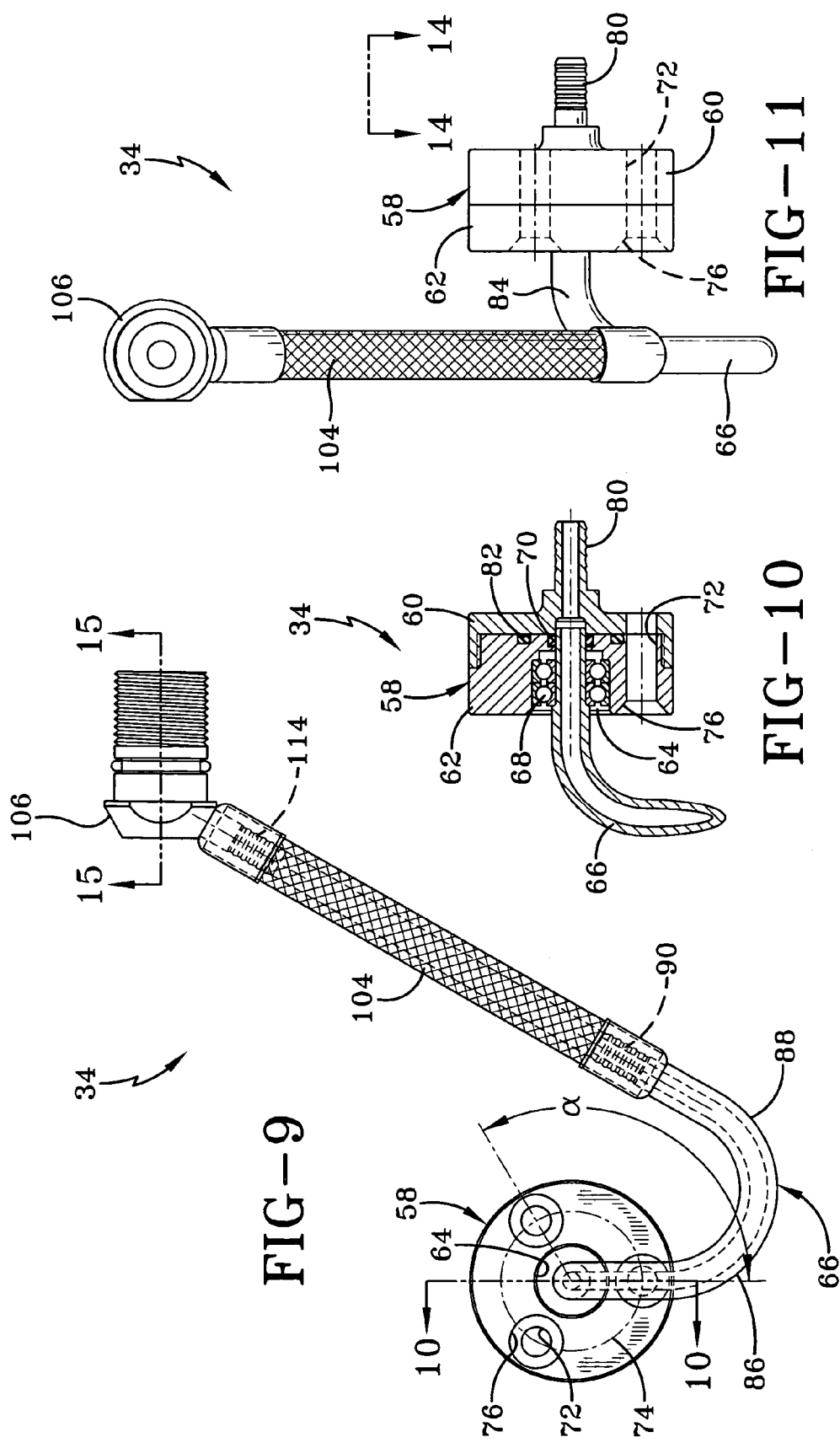

TIRE INFLATION SYSTEM APPARATUS AND METHOD

CROSS-REFERENCE TO RELATED APPLICATIONS

This application is a continuation-in-part of U.S. patent application Ser. No. 10/794,942, filed on Mar. 5, 2004 now abandoned.

BACKGROUND OF THE INVENTION

1. Field of the Invention

The invention relates to the art of tire inflation systems. More particularly, the invention relates to tire inflation systems for heavy-duty vehicles such as tractor-trailers or semi-trailers, which can operate as the vehicles are moving.

2. Background Art

All tractor-trailers include at least one trailer, and sometimes two or three trailers, all of which are pulled by a single tractor. Each trailer typically includes eight or more tires, each of which is inflated with air. Optimally, each tire is inflated to a recommended pressure that is usually between about 70 pounds per square inch (psi) and about 130 psi. However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not under-inflated. Should an air check show a tire that is under-inflated, it is desirable to enable air to flow into the tire to return it to an optimum tire pressure.

The large number of tires on any given trailer setup makes it difficult to manually check and maintain the optimum tire pressure for each and every tire. This difficulty is compounded by the fact that multiple trailers in a fleet may be located at a site for an extended period of time, during which the tire pressure might not be checked. Any one of these trailers might be placed into service at a moment's notice, leading to the possibility of operation with under-inflated tires. Such operation may increase the chance of failure of a tire in service as compared to operation with tires in an optimum inflation range.

Moreover, should a tire develop a leak, for example, as a result of striking a road hazard, the tire could fail if the leak continues unabated as the vehicle travels over-the-road. The potential for tire failure often is more pronounced in vehicles such as tractor-trailers that travel for long distances and/or extended periods of time.

As a result of such problems, prior art systems were developed that attempt to automatically monitor the pressure in a vehicle tire and/or inflate the vehicle tire with air to a minimum tire pressure as the vehicle is moving. Many of these automated systems utilize rotary unions that transmit air from a pressurized axle or air line to the rotating tires. These prior art systems either are constantly pressurized or use an intermittent pressure check-and-fill procedure. However, these prior art systems exhibit several disadvantages.

Rotary unions that are constantly pressurized enable a simple mechanical air pressure regulator to set the tire pressure. Such systems typically utilize a flow switch to warn of low tire pressure, a leaking line or a punctured tire. However, such systems generally also can give false positive warnings. For example, simply filling the air lines may cause a sensor to give a false positive warning. Moreover, constantly pressurized rotary unions have high contact pressure at the sealing point of the rotary union seals, which limits the useful life of the rotary union.

Systems which utilize intermittent pressurization of the rotary union dramatically reduce the time that the rotary union seals are under pressure, thereby typically increasing the life of the rotary union. However, such intermittent-type systems generally require some type of electronic control which includes simple solenoid valves and a pressure-measuring device. Some of these systems also require a personal computer (PC) to be interfaced to the electronic controller to program tire pressure settings. However, access to PC's, the proper interface cables and interface modules often are not readily available in the field, creating problems when the tire pressure setting is to be changed. Other intermittent-type systems are preprogrammed with a self-learn mode that does not require the PC interface. However, such systems require each tire on a given trailer to be manually inflated, which is problematic since many original equipment manufacturers of trailers do not have consistent shop air pressure to enable uniform tire inflation, particularly on higher-inflation pressure tires. Consequently, the self-learn mode sets to the lowest tire pressure, which can be significantly less than optimal.

In addition, constantly pressurized rotary union systems and intermittently pressurized rotary union systems include check valves between the air supply and each tire. These check valves in effect isolate each tire by allowing air to flow into the tire but not out. Moreover, in intermittently pressurized rotary union systems, check valves hold the air in each respective tire when the system is not pressurized. However, if the control systems of the prior art tire inflation systems detect a failure or malfunction of a check valve, they do not compensate by maintaining pressure in the delivery lines, thereby allowing a tire to deflate should a respective check valve malfunction.

Moreover, rotary unions used in prior art tire inflation systems include a single-piece body construction that prevents servicing of the rotary union, as well as multiple-piece rigid air tubes that could fail at the joint between the tubes. These prior art rotary unions also have a means of attachment to the axle that is not optimum for long-term use and hose barb fittings that potentially can allow air hoses to work loose over time. With such characteristics, these prior art rotary unions thus are potentially susceptible to premature failure, which is highly undesirable.

As a result, the tire inflation systems of the prior art include significant disadvantages by not providing reliable automatic control over the inflation process, failing to keep the system pressurized in the event of malfunction of check valve, failing to communicate system problems, and potentially lacking long-term rotary union stability. Therefore, a longstanding need has existed in the art for a tire inflation system that provides for more extensive monitoring and more reliable control of the tire inflation process, communication of system problems without a PC interface, improved mechanical stability of the rotary union, and an ability to maintain air pressure if a check valve fails.

SUMMARY OF THE INVENTION

One objective of the present invention is to provide a tire inflation system with an improved ability to accurately check and monitor the inflation pressure of a vehicle tire.

Another objective of the present invention is to provide a tire inflation system that inflates a vehicle tire with improved control, thereby providing relatively rapid inflation without substantial over-inflation of the tire.

Yet another objective of the present invention is to provide a tire inflation system that maintains air pressure in a vehicle tire in the event of a malfunction of a check valve.

Still another objective of the present invention is to provide a tire inflation system that communicates system problems to a user without the need for a PC interface.

A further objective of the present invention is to provide a rotary union for a tire inflation system that is more stable and longer-lived than rotary unions of the prior art.

These objectives and advantages are obtained by the tire inflation system of the present invention. An air supply source is in selective fluid communication with a tire via a pneumatic conduit. A first valve is in fluid communication with the pneumatic conduit in between a first portion and a second portion of the conduit. A second valve is in fluid communication with the pneumatic conduit between the second portion and a third portion of the conduit and includes a vent channel that selectively vents air from the third portion of the conduit to atmosphere. A first pressure indicator is in fluid communication with the first portion of the pneumatic conduit and a second pressure indicator is in fluid communication with the third portion of the pneumatic conduit. A rotary union is in fluid communication with the third portion of the conduit adjacent the tire. The rotary union includes a hardened one-piece air tube, and the air tube has at least one bend and is rotatably mounted in the body of the rotary union.

These objectives and advantages are also obtained by the method of tire inflation of the present invention. A tire inflation system having an air supply source in fluid communication with a tire via a pneumatic conduit, which includes a tire pressure retention valve in the pneumatic conduit adjacent to the tire, is provided. An inflation pressure of the tire is determined with a step-up procedure, which includes communicating small air bursts from the air supply source to a portion of the pneumatic conduit between the air supply source and the tire pressure retention valve. The tire is inflated with an extended-pulse procedure, which includes communicating extended bursts of air from the air supply source to the tire. A shut-down sequence is performed once a predetermined target inflation pressure in the tire is reached.

These objectives and advantages are further obtained by the additional method of tire inflation of the present invention. A tire inflation system having an air supply source in fluid communication with a tire via a pneumatic conduit, which includes a tire pressure retention valve in the pneumatic conduit adjacent the tire, is provided. An inflation pressure of the tire is determined with a step-up procedure, in which air bursts are communicated from the air supply source to a portion of the pneumatic conduit between the air supply source and the tire pressure retention valve. The volume of at least one selected communicated air burst is related to a volume of a section of the conduit. The tire is inflated with an extended-pulse procedure, in which extended bursts of air are communicated from the air supply source to the tire. A shut-down sequence is performed once a predetermined target inflation pressure in the tire is reached.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

FIG. 6, including FIGS. 6A-6K, is a flow chart of the steps of the tire inflation method of the present invention;

FIG. 9 is a front elevational view, with hidden portions illustrated in phantom lines, of the rotary union assembly of the tire inflation system of the present invention;

FIG. 10 is a sectional view taken along line 10-10 of FIG. 9;

FIG. 11 is a side elevational view, with hidden portions represented by phantom lines, of the rotary union shown in FIG. 9;

Similar numerals refer to similar parts throughout the drawings.

DESCRIPTION OF THE PREFERRED EMBODIMENT

The present invention utilizes a tire inflation system of the intermittent type, but with a simple controller that is free of the self-learn or PC interface systems found in prior art systems that are described above. The components of the system of the present invention and the method of control of those components provide more reliable control than systems of the prior art, communication of system problems, and the ability to maintain pressure should a check valve fail. In addition, the rotary union of the system includes several aspects that make it more dependable and likely longer-lived than rotary unions of the prior art. It is to be understood that the drawings and the following description are for purposes of illustrating a preferred embodiment of the invention and not for limiting the same.

Figure 1:
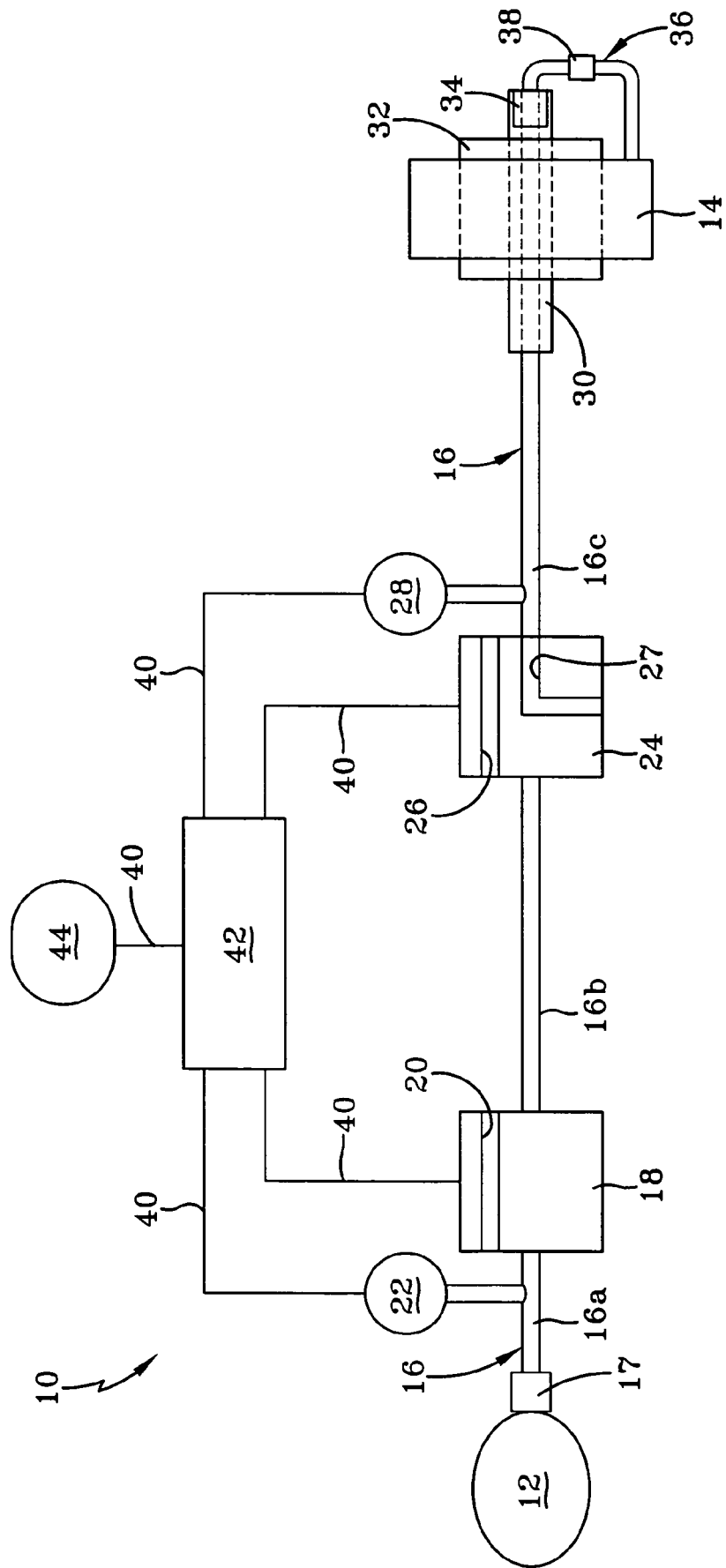
FIG. 1 is a schematic diagram of the main components of the tire inflation system of the present invention.

Turning now to FIG. 1, a tire inflation system of the present invention is indicated generally at 10 and is schematically shown. Tire inflation system 10 is a pneumatic system with electronic control and includes a supply source 12 of pressurized or compressed air. Supply source 12 includes components known in the art, such as a compressor, accumulator, and/or tank, as well as combinations thereof, and will be referred to hereinbelow for the purpose of convenience as a supply tank 12. Tank 12 optimally is charged with compressed or pressurized air to about 120 pounds per square inch (psi), but may fluctuate between about 85 psi and about 130 psi, and is connected, by components to be described in detail below, to vehicle tires 14. For the purpose of convenience, only a single tire 14 is illustrated, but it is to be understood that tire inflation system 10 can be, and typically is, utilized with multiple tires.

A pneumatic conduit 16 extends between and interconnects components of inflation system 10. More particularly, a first pneumatic conduit section 16a extends between and fluidly connects tank 12 via a pressure protection (PPT) valve 17 to a first, or supply, valve 18. First valve 18 may be of any type that is well-known in the art, such as a ball valve, gate valve, solenoid valve, and the like. Preferably, first valve 18 is a solenoid valve and will be referred to hereinbelow as such. Supply solenoid 18 includes a channel 20 that facilitates the transfer of air through the supply solenoid when the solenoid is energized or open. Thus, when supply solenoid 18 is energized, channel 20 aligns with and is fluidly connected with first conduit section 16a and air passes through the solenoid, effectively moving from tank 12 through pressure protection valve 17 to the remaining components of system 10. When supply solenoid 18 is de-energized, that is, in a closed position as shown in FIG. 1, no air passes from first conduit section 16a through the supply solenoid. A first pressure transducer 22, also known as a supply transducer, is fluidly connected to first pneumatic conduit section 16a to measure the air pressure between tank 12 via pressure protection valve 17 and supply solenoid 18, which is referred to herein as the supply pressure.

When supply solenoid 18 is energized, pressurized air passes through it to a second pneumatic conduit section 16b and to a second valve 24, also known as a delivery valve, which in turn is connected to a third pneumatic conduit section 16c. As with supply solenoid 18, delivery valve 24 may be of any type that is well-known in the art, such as a ball valve, gate valve, solenoid valve, and the like. Preferably, second valve 24 is a solenoid valve and will be referred to hereinbelow as such. Delivery solenoid 24 includes a first channel 26 that aligns with second pneumatic conduit section 16b and third pneumatic conduit section 16c to facilitate the transfer of air through the delivery solenoid when the solenoid is energized or open. Delivery solenoid 24 also includes a second channel 27, also referred to as a vent channel, that aligns with third pneumatic conduit section 16c when the delivery solenoid is de-energized, or closed, to vent that section to the atmosphere, as shown in FIG. 1. A second pressure transducer 28, also known as a delivery transducer, is fluidly connected to third pneumatic conduit section 16c to measure the air pressure in that conduit section, which is referred to herein as the delivery pressure.

After pressurized air passes through delivery solenoid 24 when the delivery solenoid is energized, it proceeds through third pneumatic conduit section 16c, which passes through a vehicle axle 30, on which a wheel 32, including tire 14, is rotatably mounted in a usual manner. A rotary union 34, to be described in greater detail below, is mounted on an outboard end of axle 30 and facilitates fluid communication between third pneumatic conduit section 16c and an air tube assembly 36, which in turn fluidly connects to tire 14. A tire pressure retention valve 38 (also shown in FIG. 19) is included in air tube assembly 36. Tire pressure retention valve 38 may be of any type that is well-known in the art, and is preferably a check valve and will be referred to hereinbelow as such. Check valve 38 is biased to a closed position when the air pressure in tire 14 is higher than the air pressure in third pneumatic conduit 16c to isolate each tire 14 from the rest of system 10, including other tires. Thus, air passes from supply tank 12 via pressure protection valve 17 through supply solenoid 18, delivery solenoid 24 and axle 30 via pneumatic conduit 16 to arrive at rotary union 34, where it passes through air tube assembly 36, including check valve 38, and into tire 14.

It is important to note that, as mentioned above, system 10 typically includes a plurality of tires 14, which are often mounted on opposing ends of multiple of axles 30 via respective wheels 32. To deliver pressurized air to each tire 14, third pneumatic conduit section 16c branches off, with each branch extending through a respective selected axle 30. In addition, more than one tire 14 may be mounted on one end of axle 30. In this case, air tube assembly 36 branches off to each respective tire after rotary union 34 at the end of axle 30. Thus, while reference herein is made to certain components in singular form for the purposes of ease and clarity of description, it is to be understood that, since multiple tires 14 are included on the vehicle, multiple axles 30, wheels 34, rotary unions 34, air tube assemblies 36, check valves 38 and associated components are contemplated.

Figure 2:
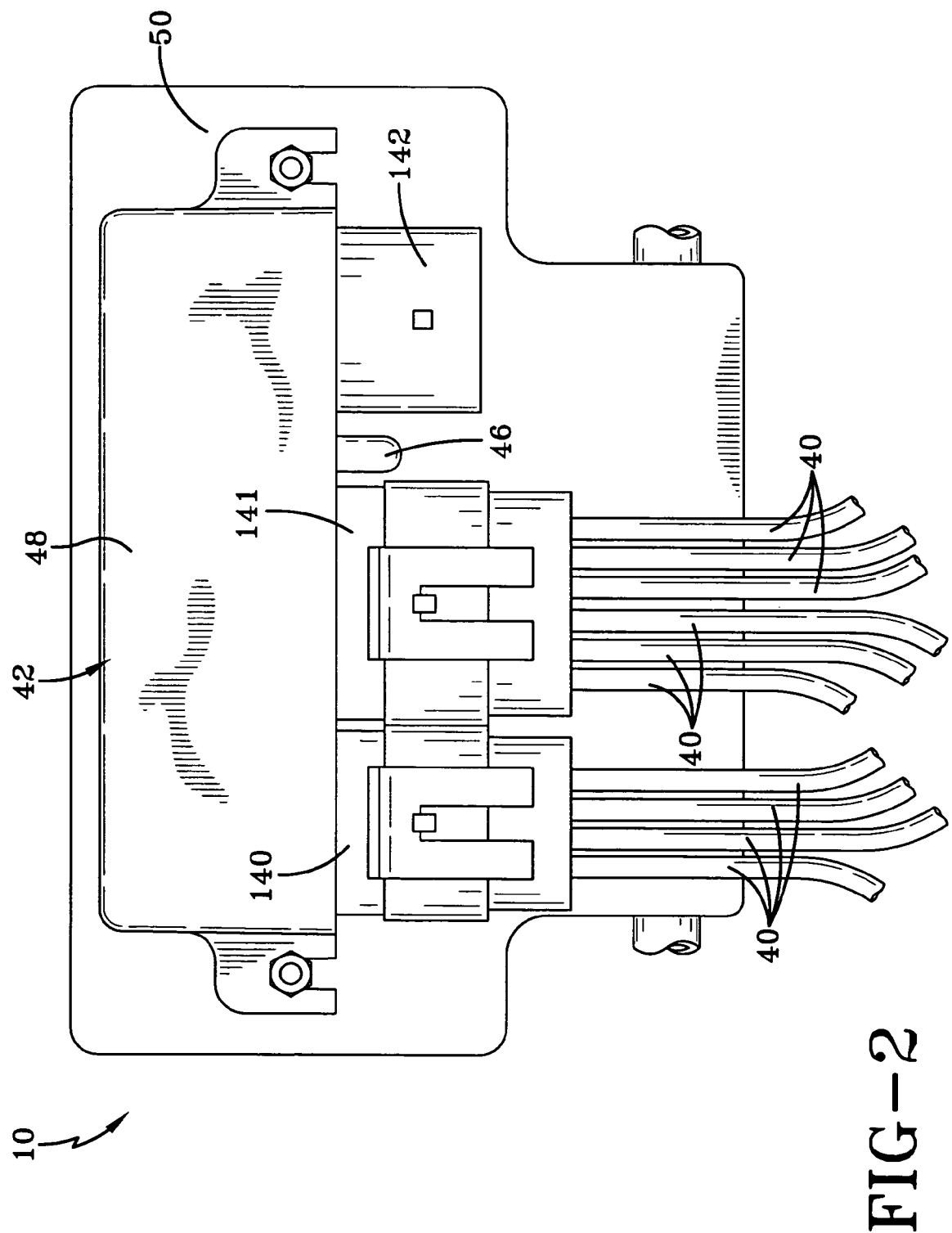
FIG. 2 is a fragmentary top plan view showing the electronic control unit of the tire inflation system of the present invention.

To monitor and control system 10, solenoids 18, 24 and pressure transducers 22, 28 are connected via wires 40 or other means known in the art, such as fiber-optic cable, coaxial cable, radio frequency and the like, to an electronic control unit 42. Preferably, electronic control unit 42 is a programmable micro-controller and is operatively connected by wires 40 or other above-described means to a warning light system 44. With additional reference to FIGS. 2 and 3, warning light system 44 preferably includes two separate lights, that is, a light-emitting diode (LED) 46 and an indicator lamp (not shown). Control unit 42 is mounted in a housing 48, on which LED 46 is mounted. Controller housing 48 optionally may be fastened to a base 50 that is mechanically connected to solenoids 18, 24 for packaging convenience. Base 50 in turn is mounted to a frame member of the vehicle, for example, to a cross member of a slider assembly, where a technician is able to view LED 46. The indicator lamp, meanwhile, is mounted on the vehicle trailer, or in the cab of the vehicle, where it can be seen by the operator of the vehicle.

Figure 3:
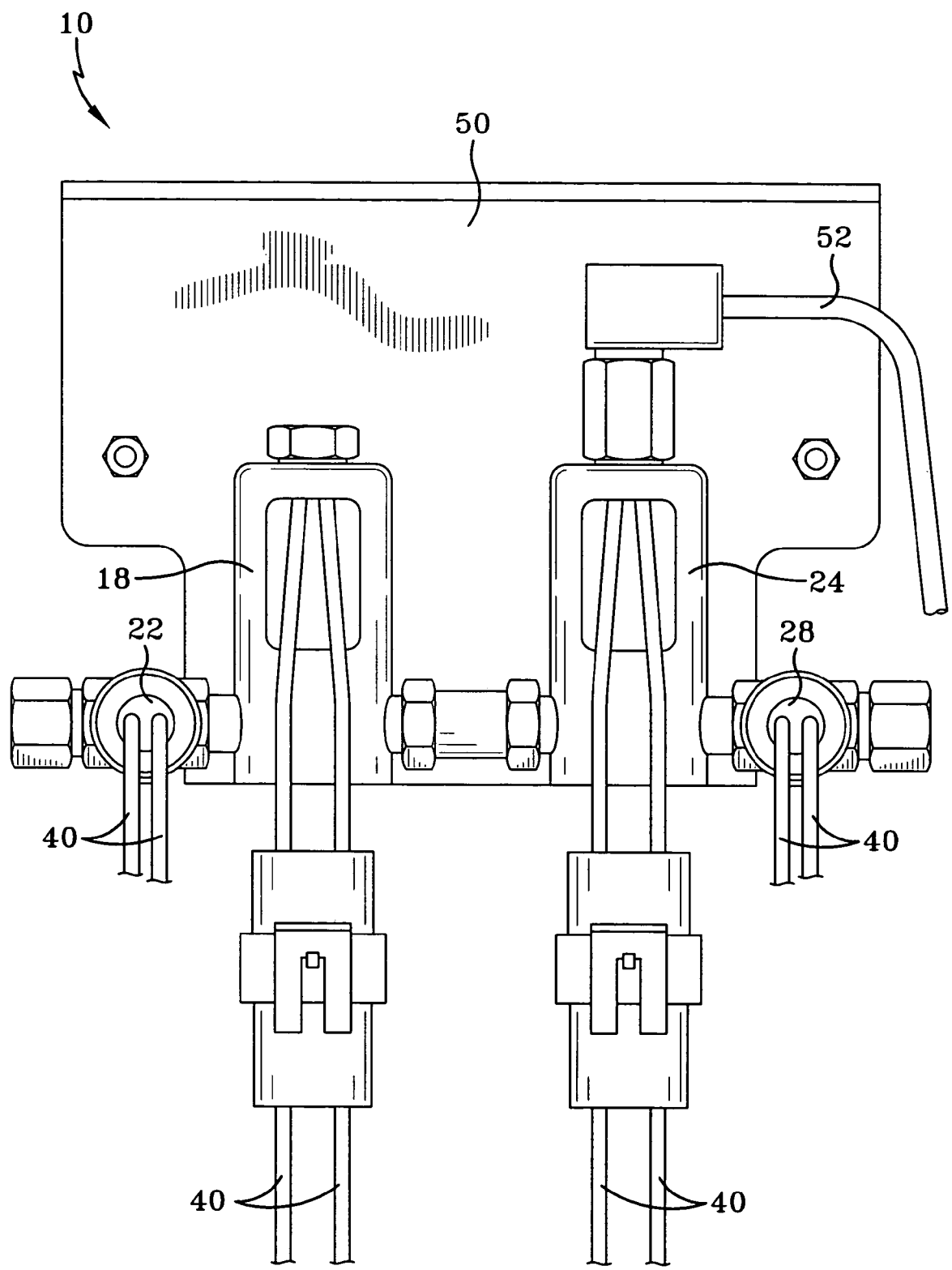
FIG. 3 is a fragmentary bottom plan view of the components shown in FIG. 2, and in addition showing the pressure transducers and solenoids of the system.

It is to be noted that second channel 27 of delivery solenoid 24 fluidly connects to a vent tube 52, shown in FIG. 3. Vent tube 52 ensures conveyance of vented air from third pneumatic conduit section 16c when delivery solenoid 24 is de-energized. Vent tube 52 is also a porting structure which includes a fitting to allow an air line from a maintenance shop (not shown) to be attached to the tube to check a portion of system 10 for air leaks when the system is not energized. More particularly, when delivery solenoid 24 is de-energized, the shop air line is attached to vent tube 52 and pressurized air from the shop line passes through the vent tube and through second channel 27 of the delivery solenoid into third pneumatic conduit section 16c and a portion of air tube assembly 36 up to check valve 38. In this manner, a closed, pressurized air circuit is formed, which allows this portion of system 10 to be checked for leaks without energizing the system.

LED 46 is used to visually verify pressure settings, blink out error codes and ensure that controller 42 has an adequate electrical power supply. More specifically, as noted above, tire pressure settings for trailers of heavy-duty vehicles can be anywhere from about 70 to about 130 psi with current tire designs. It is possible to break down the requirements for various tire pressures to increments of 5 psi while still satisfying industry requirements. Therefore, it is desirable to preprogram controller 42 with options enabling a technician to select various tire pressure settings in 5 psi increments.

Figure 4:
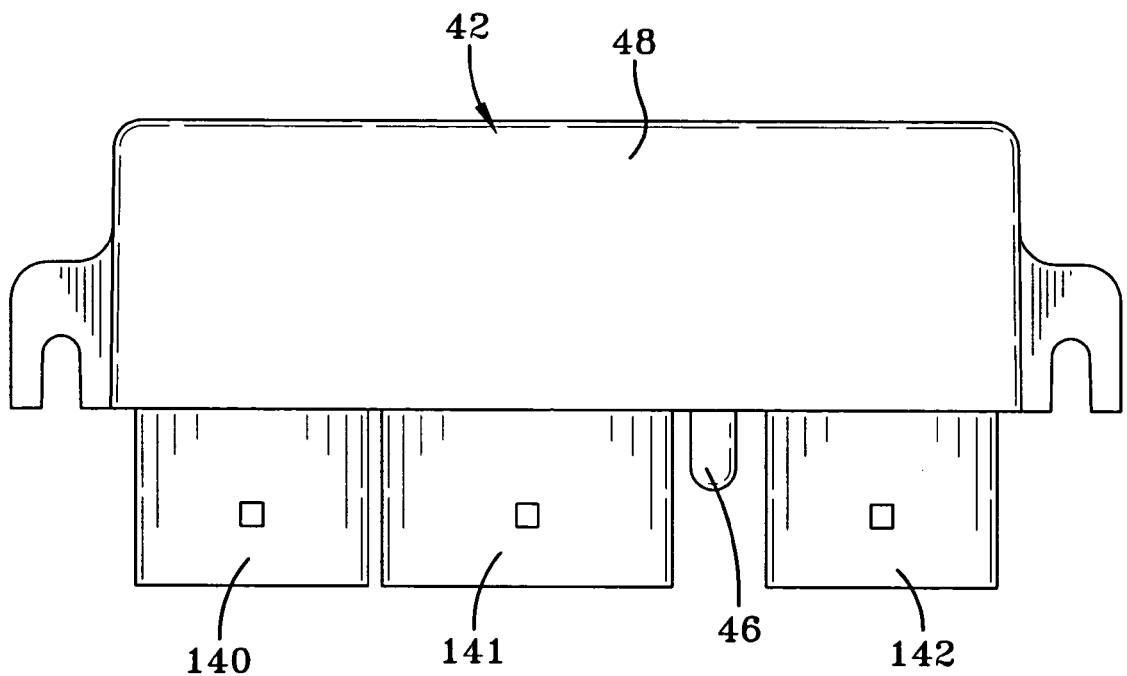
FIG. 4 is a plan view of the electronic of the control unit system shown in FIG. 2.
Figure 5:
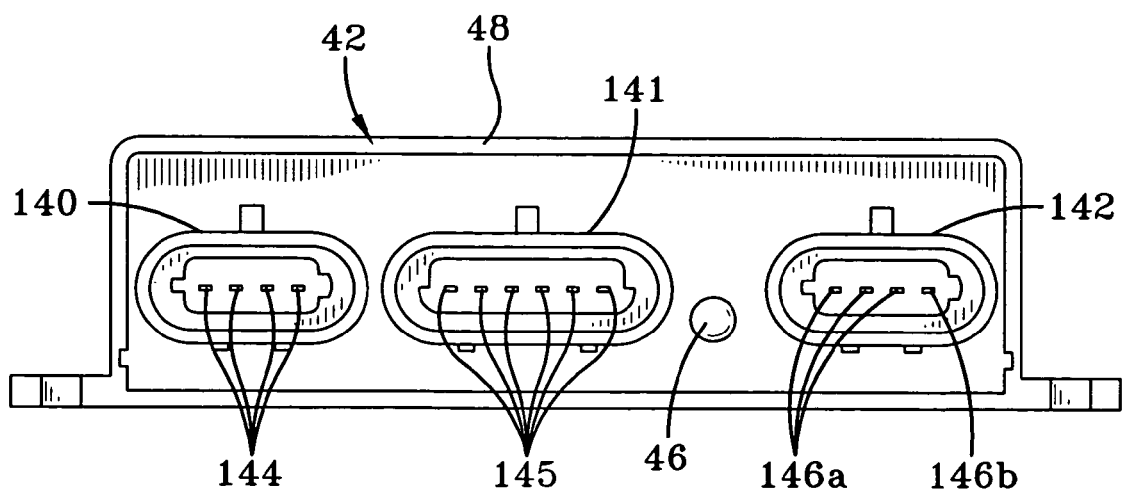
FIG. 5 is a front elevational view of the electronic control unit shown in FIG. 4.

Turning now to FIGS. 4 and 5, controller 42 includes a first electrical connector 140, a second electrical connector 141 and a third electrical connector 142. First electrical connector 140 preferably has four pins 144 that are used to electrically connect to solenoid valves 18, 24 (FIG. 1). Second electrical connector 141 preferably has six pins 145 that are used to electrically connect to pressure transducers 22, 28. Third electrical connector 142 preferably has four pins 146, wherein three of the pins 146a electrically connect controller 42 to an electrical power source, a ground and a line that powers the indicator lamp (all not shown). A fourth pin 146b is for connection directly to another pin on controller 42 and is left unused and covered with a protective device, such as a rubber plug, when tire inflation system 10 is operating in a non-programming mode.

Figure 6A:
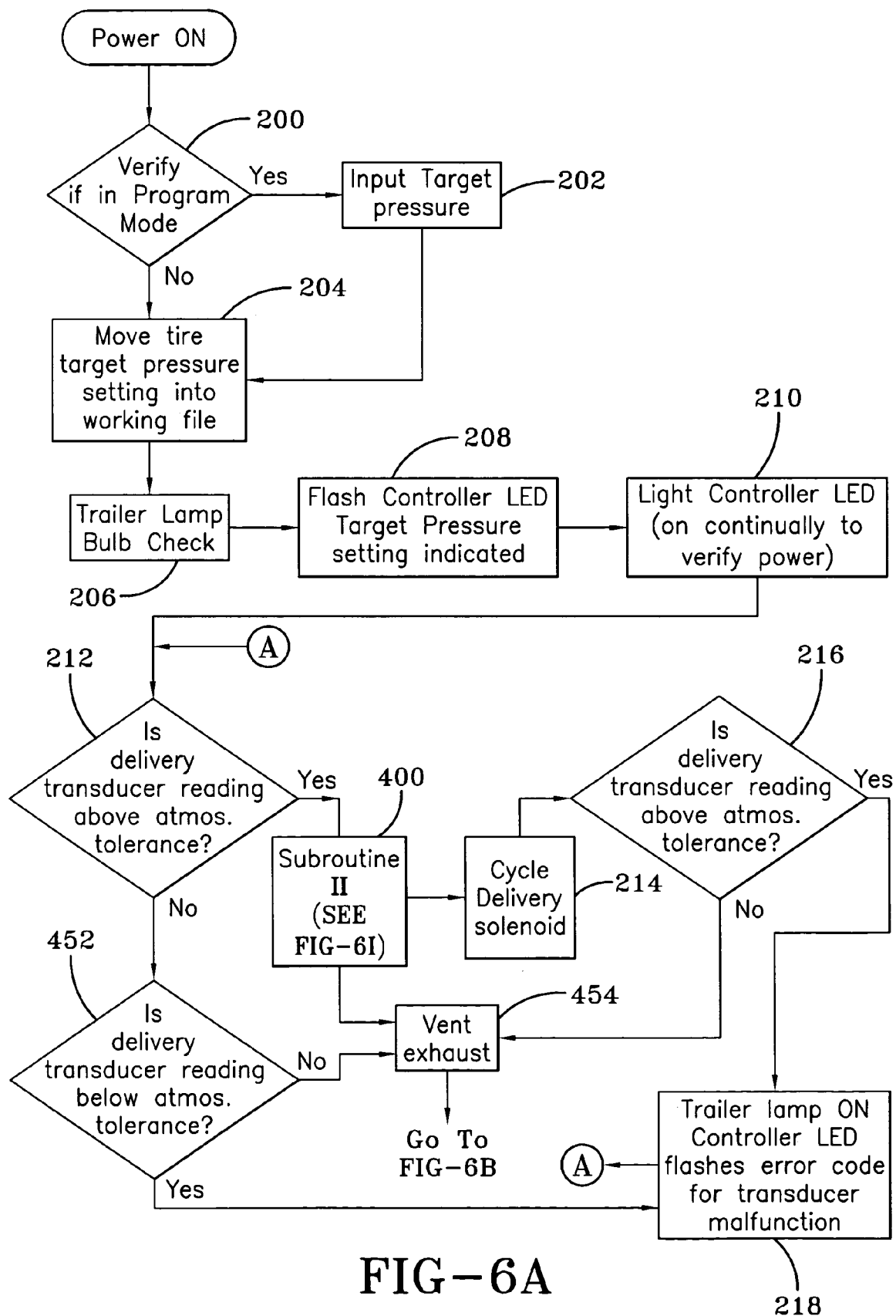

With additional reference now to the flow chart of FIG. 6, by applying a voltage to fourth pin 146b, when it is desired to program controller 42, the controller recognizes that it is to enter a programming mode, step 200 (FIG. 6A). Controller 42 then looks for a voltage pulse on another pin, such as one of pins 145 connected to pressure transducers 22, 28, and counts pulses, step 202. When the voltage to fourth pin 146b is removed, controller 42 takes the number of pulses on selected pin 145 and uses the number of pulses to determine which location in the permanent memory area of the micro-controller from which to copy the pressure-setting information. This information then is written to a separate non-volatile reprogrammable location in the micro-controller area of controller 42 as the target pressure setting, step 204. Once the target pressure is saved, LED 46 blinks out a verification of the pressure setting, step 208, for example, one blink for each voltage pulse that was originally entered. That is, LED 46 blinks once for every 5 psi, beginning at 70 psi, up to a maximum of 130 psi.

Since all pressure setting information is originally programmed on controller 42, the controller can be factory-set with a specific pressure setting so that a self-learn mode or a PC is not required to have system 10 operate immediately upon powering up. To change the pressure setting in step 202, a technician preferably uses a portable device that is known in the art (not shown) to apply voltage to fourth pin 146b of controller 42 and make voltage pulses to another pin, such as one of the pins 145 of second connector 141, via a simple interface harness. It also is contemplated that an interface box (not shown) with a separate microcontroller may be used, which would allow automatic feedback from controller 42 in response to the voltage pulses, thereby indicating that the reprogramming was successful. It is further contemplated that a more advanced technique may be used in step 202 to change the pressure setting, such as serial communication. A more advanced interface box (not shown) with a higher-level controller may be used to apply voltage to fourth pin 146b of controller 42 and make voltage pulses to another pin, such as one of the pins 145 of second connector 141, and provide more extensive programming of the components of system 10.

When it is not in a programming mode, LED 46 indicates certain problems of system 10 via special blink codes. A specific blink code that corresponds to a given problem, as described below, continues to be displayed until a technician observes LED 46 and addresses the problem, precluding the need for external computer diagnostics. When system 10 is powered and functioning properly, LED 46 remains continuously illuminated, step 210, after the initial indication of the target tire pressure described above.

Turning to the indicator lamp of warning light system 44, the lamp informs the operator of the vehicle if there is a problem with system 10. As mentioned above, the indicator lamp can be mounted in the tractor cab or on the trailer of the vehicle where the operator can see it. When system 10 is powering up, warning light system 44 causes the indicator lamp to show that the inflation system has power 206, such as by blinking twice, and then to de-luminate to indicate normal status. If there is a problem, warning light system 44 causes the indicator lamp to remain illuminated, as described below, alerting the operator that a problem exists.

Controller 42 performs various checks of components of system 10 to ensure proper functioning before proceeding to check tire pressure. A check of delivery pressure transducer 28 is performed by reading the pressure indicated by the delivery transducer when delivery solenoid 24 is de-energized, which is when the delivery solenoid vents to atmosphere, step 212. It is to be understood that supply and delivery transducers 22, 28 are both set to indicate a gauge pressure of 0 psi at standard atmospheric pressure. Thus, taking a tolerance value of about 5 psi into account, when delivery solenoid 24 is de-energized, delivery transducer 28 should indicate that it is reading about 5 psi or less, as there is only atmospheric pressure in third pneumatic conduit 16c. If the pressure reading is about 5 psi or less, controller 42 checks delivery transducer 28 to see if it is reading below an atmospheric tolerance, such as below about −1 psi, step 452. If delivery transducer 28 is indicating a reading that is not below the atmospheric tolerance, delivery solenoid 24 is de-energized to vent to atmosphere, step 454, and controller 42 proceeds to a diagnosis of another system component. If delivery transducer 28 is indicating a reading below the atmospheric tolerance in step 452, controller 42 proceeds to activate warning light system 44, to be described below for step 218. If the pressure reading is higher than about 5 psi, controller 42 diagnoses system 10 to determine if check valve 38 is significantly leaking, thereby exceeding the capacity of vent channel 27 and/or exhaust tube 52 and back-pressurizing conduit 16 from tire 14, or if delivery transducer 28 is malfunctioning, step 400.

Figure 6B:
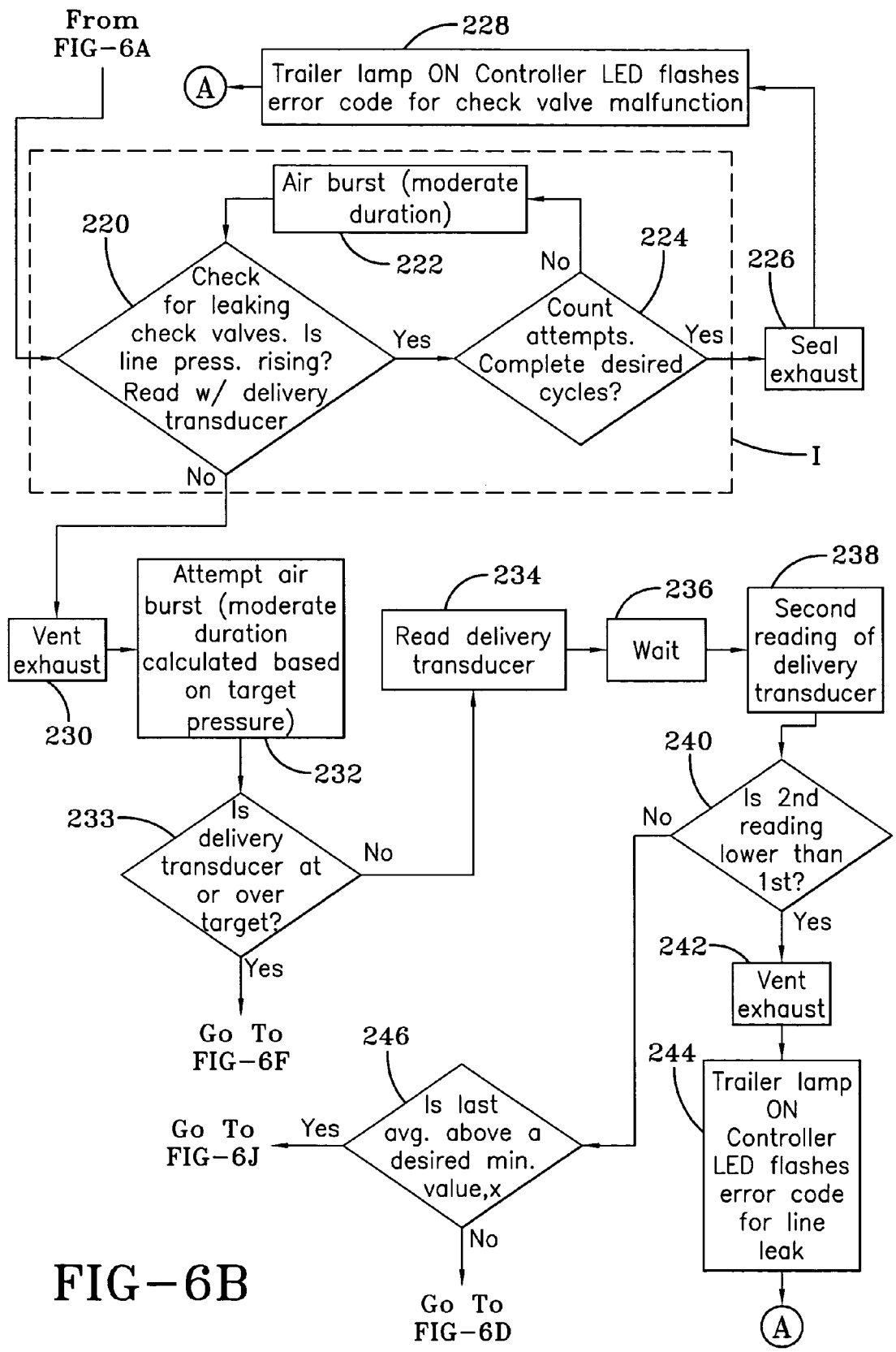
Figure 6C:
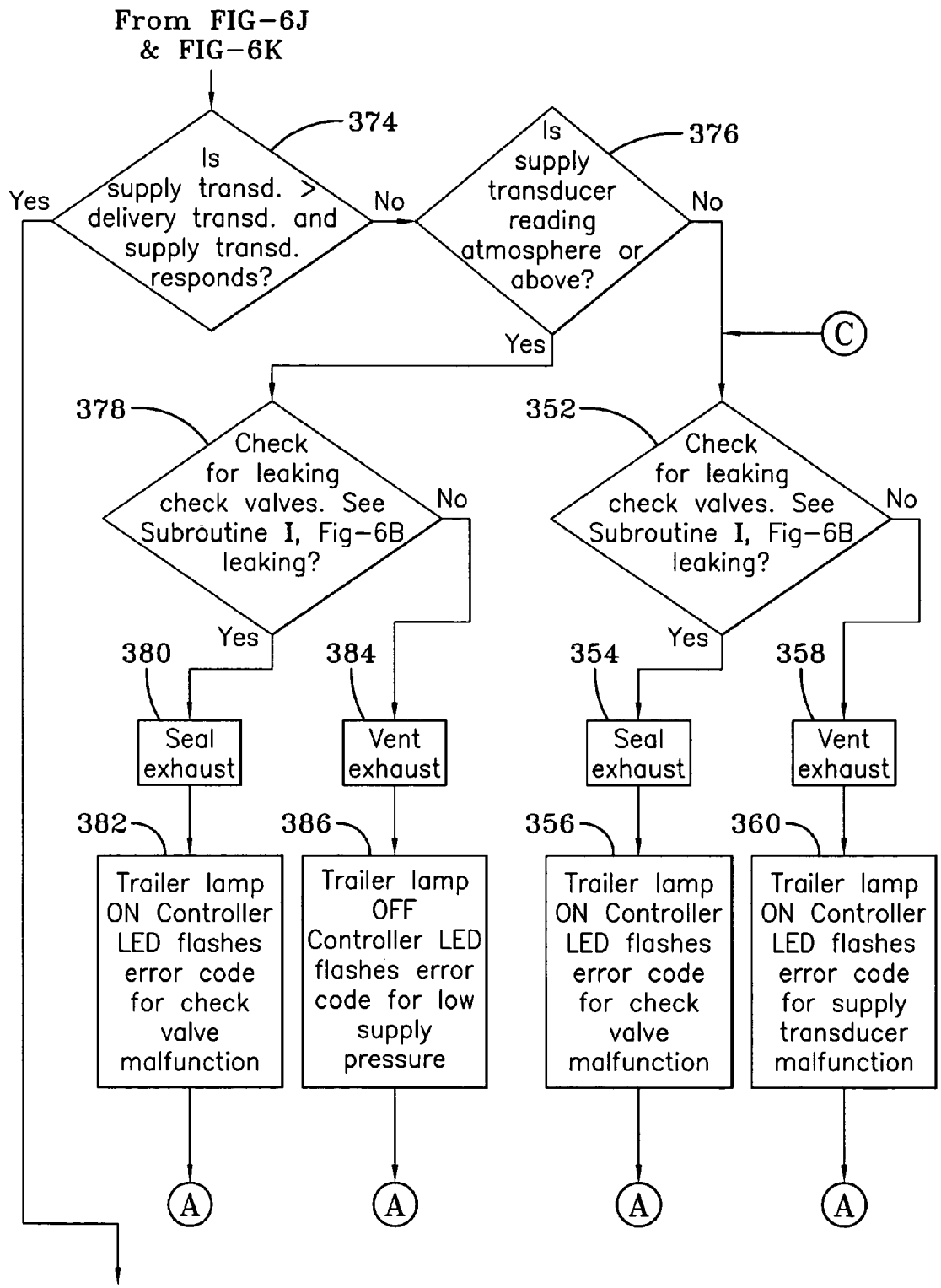
Figure 6D:
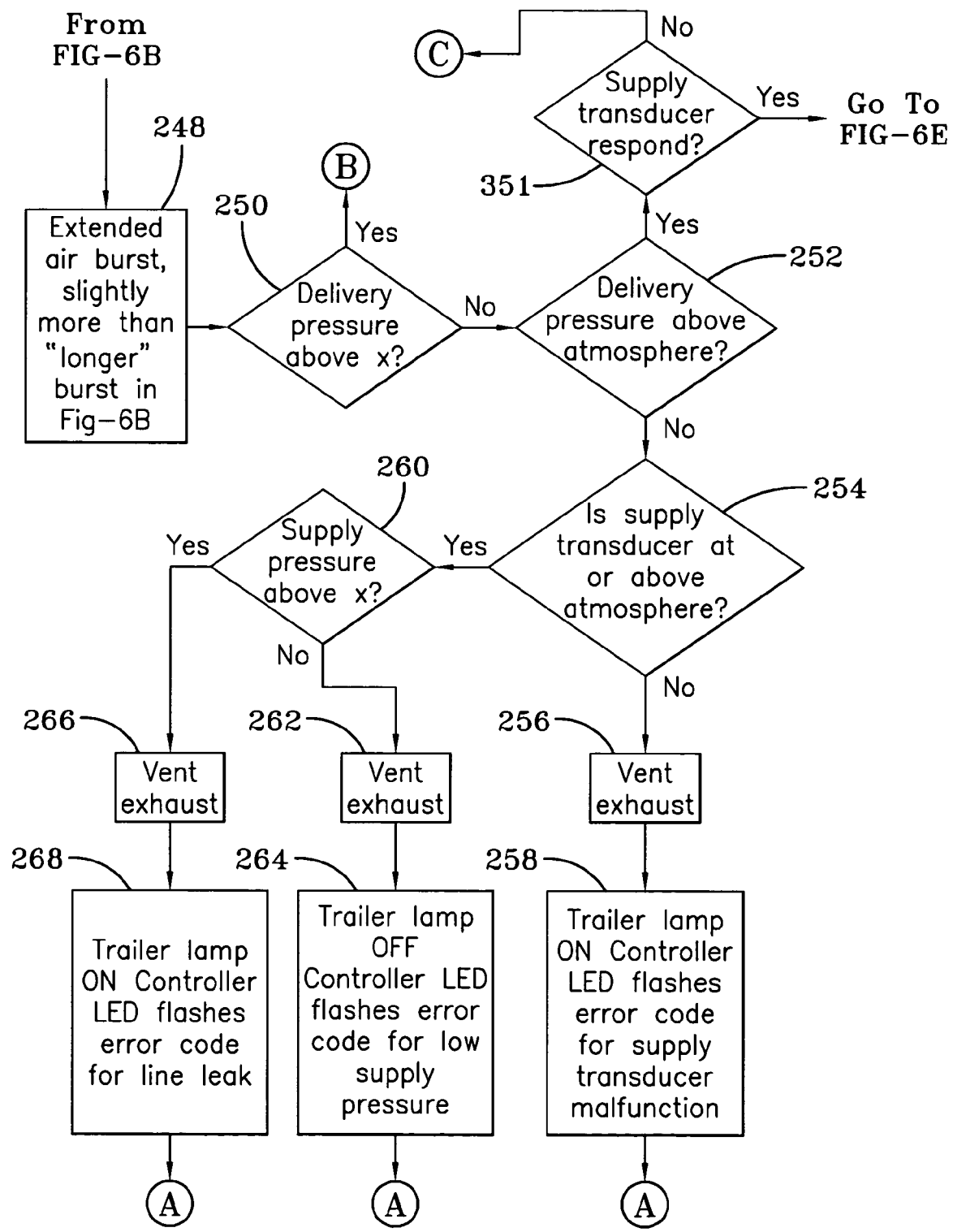
Figure 6E:
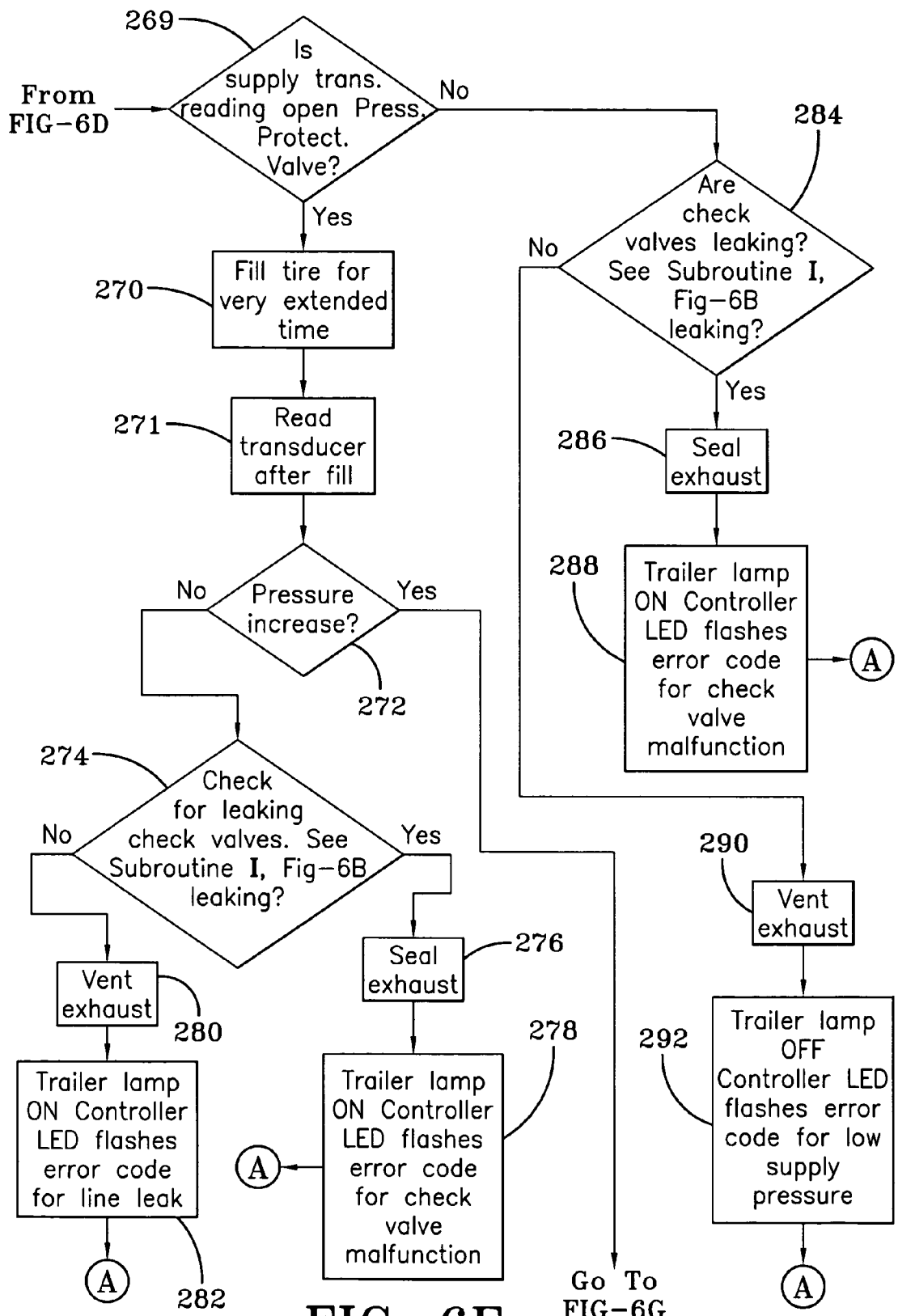
Figure 6F:
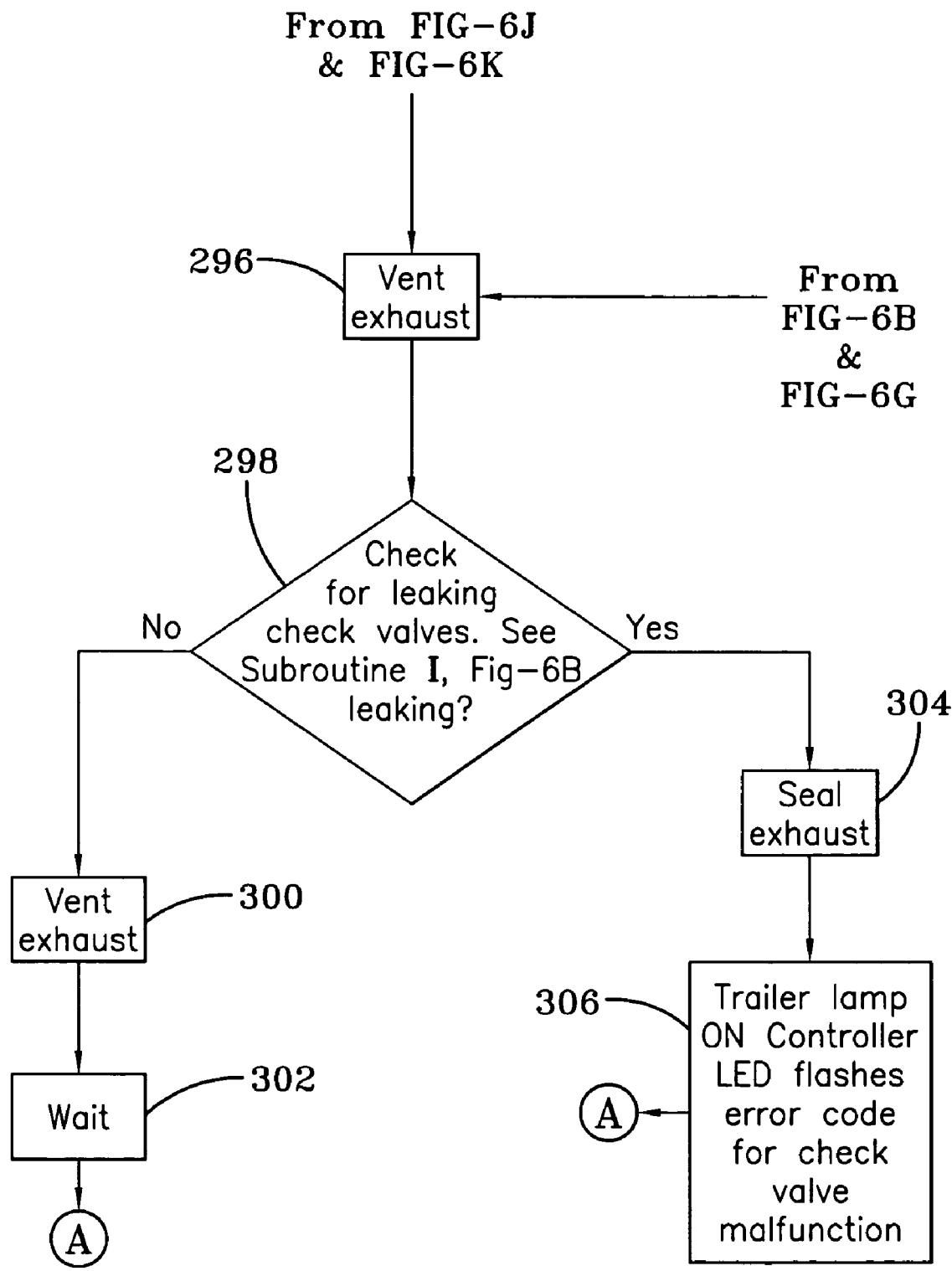
Figure 6H:
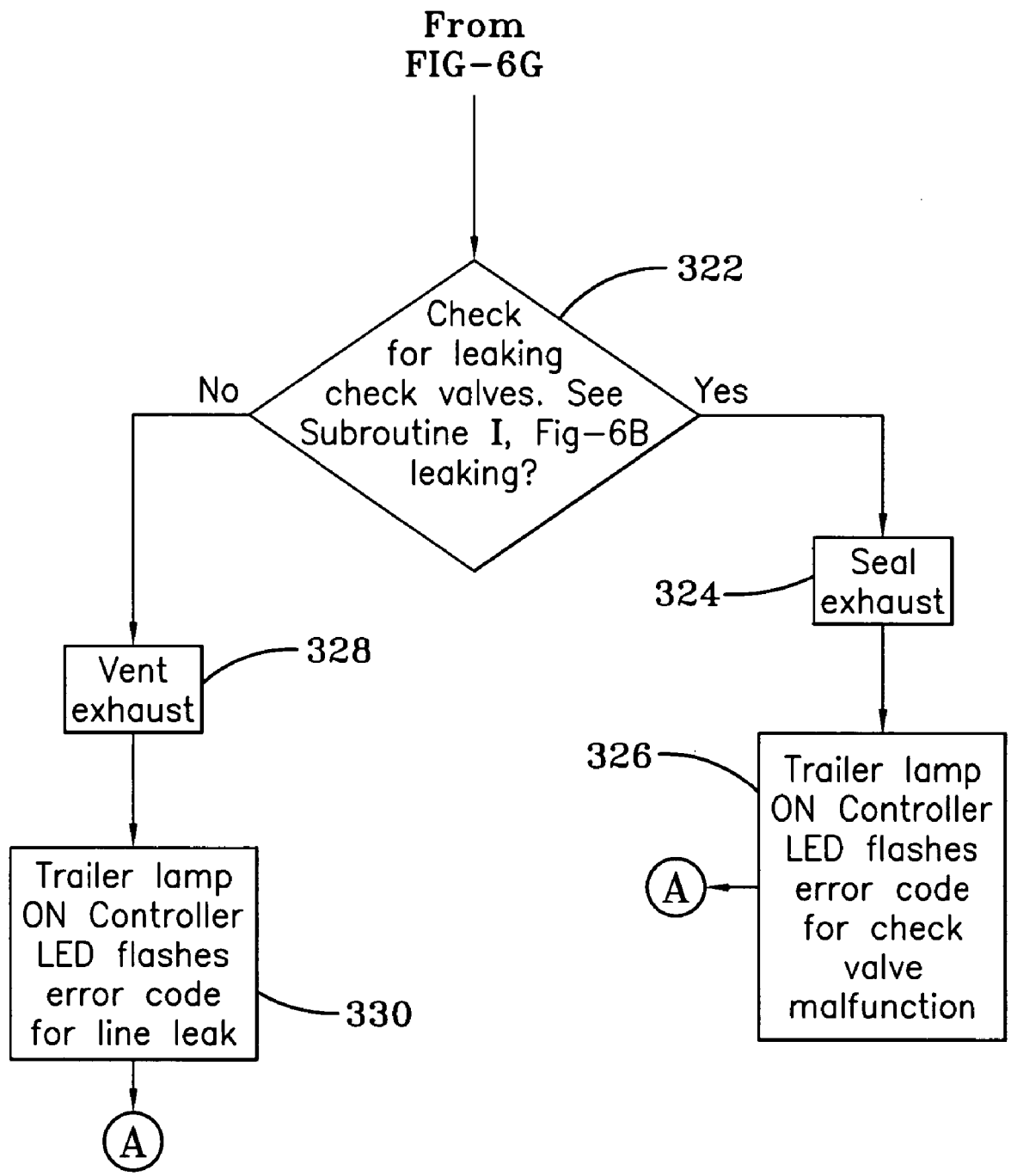
Figure 6I:
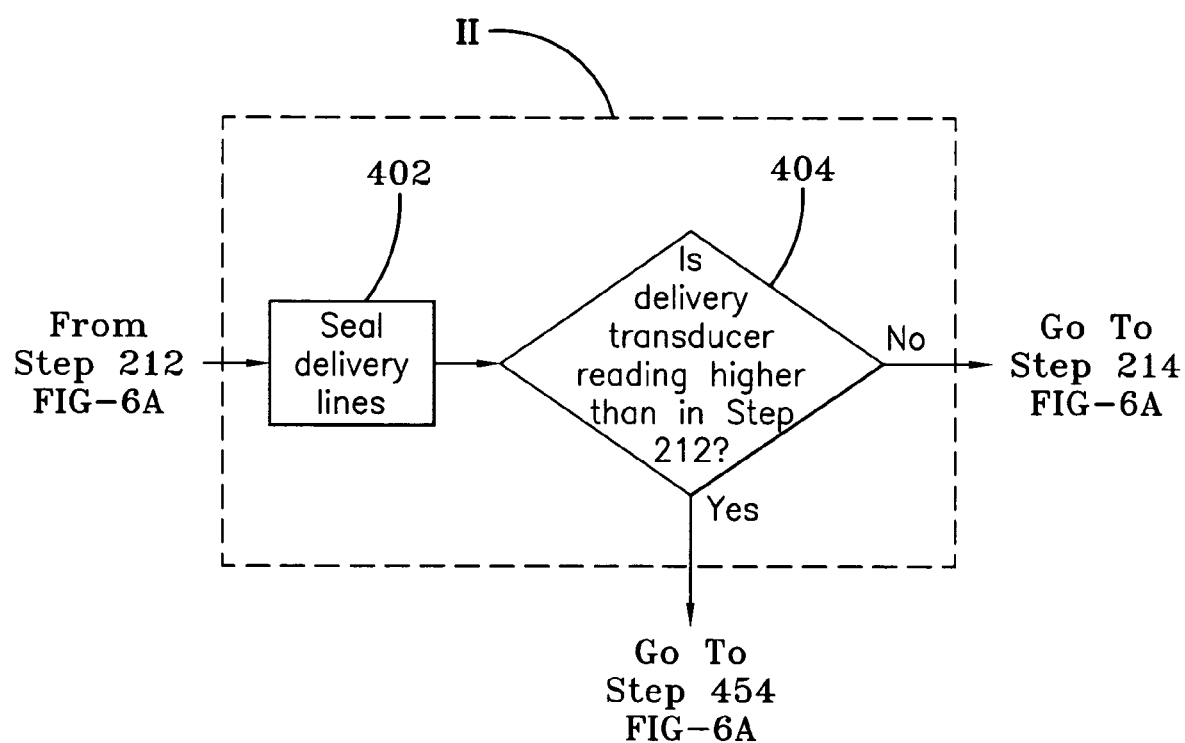

To perform this diagnosis, controller 42 executes a series of steps referred to herein as subroutine II, shown in FIG. 6I. Controller 42 energizes delivery solenoid 24 to seal second pneumatic conduit section 16b, third pneumatic conduit section 16c and the portion of air tube assembly 36 up to check valve 38, collectively referred to as the delivery lines, step 402. The pressure indicated by delivery transducer 28 is read and compared to the reading previously taken in step 212 to determine if the pressure in delivery lines 16*b*, 16*c* and 36 is increasing, step 404. If the pressure is increasing, controller 42 presumes that check valve 38 is significantly leaking and proceeds to energize delivery solenoid 24 to vent to atmosphere, step 454, and to diagnose the check valve, as will be described below. If the pressure is not increasing, controller 42 presumes that delivery transducer 28 is malfunctioning.

If delivery transducer 28 is malfunctioning, delivery solenoid 24 is energized and immediately de-energized, which is referred to as cycling. Returning to FIG. 6A, delivery solenoid 24 is cycled multiple times, for example, two times, step 214, and controller 42 again checks the pressure indicated by delivery transducer 28, step 216. If delivery transducer 28 is still reading over about 5 psi, controller 42 causes LED 46 to flash a specific blink code pattern for a malfunction of the delivery transducer and the indicator lamp is illuminated, step 218. It is important to note that when controller 42 initiates a blink code pattern that corresponds to a malfunctioning component, system 10 typically does not proceed to check the pressure in tire 14 or inflate the tire, instead waiting for a technician to remedy the problem.

Figure 19:
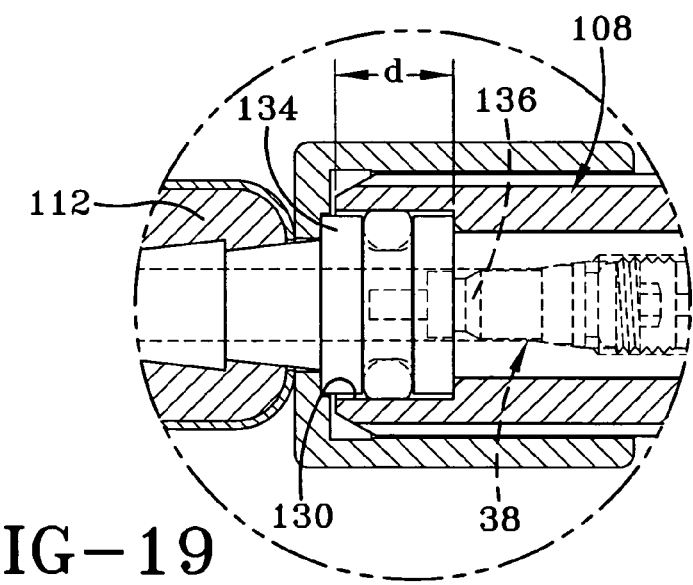
FIG. 19 is an enlarged fragmentary view of the circled portion in FIG. 18, with portions shown in section and hidden portions shown in phantom lines, of the tee fitting and hose shown in FIG. 18.

If delivery transducer 28 is determined to be functioning properly in step 216, controller 42 then proceeds to de-energize delivery solenoid 24 to vent to atmosphere, step 454, and to diagnose check valve 38. A malfunction of check valve 38 can be caused by contamination on the seal surface of the valve or a cocked valve seat 136 (FIG. 19). In the prior art, a malfunction of check valve 38 potentially allowed tire 14 to deflate by exhausting back through the system. Tire inflation system 10 of the present invention prevents deflation of tire 14 should check valve 38 malfunction, by using delivery pressure transducer 28 to check for a pressure rise or build-up in second and third pneumaric conduits 16*b*, 16*c* and sealing exhaust of delivery solenoid 24.

More particularly, turning to FIG. 6B, the diagnosis of check valve 38 includes energizing delivery solenoid 24 to seal off exhaust vent channel 27. Supply solenoid 18 remains de-energized, effectively sealing second and third conduit sections 16*b*, 16*c* and air tube assembly 36 up through check valve 38. The air pressure in third conduit section 16*c* is read with delivery transducer 28, step 220. If check valve 38 is leaking, air will pass from tire 14 into third pneumatic conduit section 16*c*, showing a build-up or rise in pressure that will be read by delivery pressure transducer 28. If an increase in pressure is indicated by delivery transducer 28, controller 42 cycles supply solenoid 18 to send a burst of air into second and third pneumatic conduit sections 16*b*, 16*c* to try to re-seat leaking check valve 38, step 222. This burst is of moderate duration, such as about 2.1 seconds. That is, supply solenoid 18 opens for approximately 2.1 seconds to provide the burst. This check and cycling may be performed a few times, if needed, step 224. Steps 220, 222, 224 that check for increasing pressure and cycle supply solenoid 18 to try to re-seat check valve 38 are referred to as subroutine I.

If check vale 38 is not able to be re-seated, that is, delivery transducer 28 continues to indicate increasing pressure, controller 42 keeps delivery solenoid 24 energized to seal off vent channel 27 and thereby prevent the tire from deflating, step 226. Controller 42 then causes LED 46 to flash a specific blink code pattern for a malfunctioning check valve, step 228, which can be diagnosed by a technician. In addition, the indicator lamp is illuminated in step 228, indicating to the vehicle operator that there is a problem. In this manner, system 10 allows second and third conduit sections 16*b*, 16*c* and the portion of air tube assembly 36 up to check valve 38 to vent when the check valve is properly functioning, thereby taking pressure off of rotary union 34, but seals the vent when the check valve malfunctions, preventing deflation of tire 14.

If check valve 38 is functioning properly, controller 42 proceeds to check the integrity of delivery lines 16*b*, 16*c*, 36. To perform the check, delivery solenoid 24 is de-energized, causing delivery lines 16*b*, 16*c*, 36 to vent to atmosphere, step 230. Delivery solenoid 24 is then re-energized and supply solenoid 18 is briefly energized to provide an air burst into second pneumatic conduit section 16*b*, which passes through into third pneumatic conduit section 16*c* and the portion of air tube assembly 36 to check valve 38, step 232. The air burst is of a moderate duration and is based on the target pressure previously selected in steps 202 and 204. It is to be noted that terms relating to duration, size and volume of air bursts are often referred to herein in an interchangeable manner, since a longer duration air burst is typically one with a larger relative volume and larger relative size. Exemplary durations for the air burst include: approximately 0.52 seconds for a target pressure of from about 70 psi to just under about 85 psi; approximately 0.65 seconds for a target pressure of from about 85 psi to just under about 95 psi; approximately 0.78 seconds for a target pressure of from about 95 psi to just under about 105 psi; approximately 0.91 seconds for a target pressure of from about 105 psi to just under about 115 psi; and approximately 1.04 seconds for a target pressure that is at or above about 115 psi. Of course, other durations for the air burst may be established through calculation or trial-and-error for a specific system. Once the air burst is provided, supply solenoid 18 is de-energized, sealing the burst of air in delivery lines 16*b*, 16*c*, 36.

Once the air burst is in delivery lines 16*b*, 16*c*, 36, a preliminary reading of delivery transducer 28 is taken, step 233. If the pressure indicated by delivery transducer 28 is at or above the target inflation pressure, controller 42 shuts system 10 down according to the shut-down procedure to be described below. If the pressure indicated by delivery transducer 28 is below the target inflation pressure in step 233, controller 42 proceeds to step 234. In step 234, delivery pressure transducer 28 is read multiple times, such as 8 times, by controller 42. This first series of readings is averaged. Several seconds, such as about 8.4 seconds, are allowed to pass, step 236, and a second series of readings is taken and averaged, step 238. If the average of the second series of readings is lower than that of the first series, taking into account a set tolerance amount, step 240, it is presumed that there is a leak in at least one of delivery lines 16*b*, 16*c*, 36. In such a case, delivery solenoid 24 is de-energized, step 242, and LED 46 is signaled by controller 42 to flash the appropriate blink code for a line leak and the trailer indicator lamp is illuminated, step 244. If the average of the second series of readings is not lower than that of the first series, again taking a set tolerance amount into account, controller 42 presumes that delivery lines 16*b*, 16*c*, 36 are not leaking and proceeds to check the air pressure in tire 14.

To check the air pressure in tire 14, controller 42 determines if the average of the second series of pressure readings indicated by delivery transducer 28 in step 238 is above a desired minimum value X, step 246. This evaluation allows controller 42 to determine if a situation such as an extremely low tire pressure or an oversize conduit must be addressed. The specific value for X is related both to the size of the air burst provided in step 232, which is dependent upon the target inflation pressure, and the particular axle configuration on which system 10 is installed. Regarding the axle configuration, system 10 may be installed on any number of different axle configurations, such as a single, tandem (two), tridem (three) or quad (four) axle setup. Of course, a quad axle setup typically includes longer lengths and thus a significantly higher total volume for delivery lines 16b, 16c, 36 when compared to a lesser axle configuration, such as a single axle. As a result, the same size air burst may return a negligible pressure reading in a quad axle configuration and a deceptively high pressure reading in a single axle configuration. Such potentially different volumes for delivery lines 16b, 16c, 36 are taken into account when establishing the amount for desired minimum value X.

An exemplary manner of accounting for potentially different air line volumes when establishing desired minimum value X is to plot the pressure in delivery lines 16b, 16c, 36 versus the volume of those lines for the specific time duration of the air burst in step 232. For example, for a target pressure of from about 70 psi to just under about 85 psi, the duration of the air burst in step 232 is about 0.52 seconds. Thus, line pressure versus line volume for a 0.52 second burst can be plotted. The resulting graph is a decreasing function, that is, a curve indicating a higher pressure when there is a lower volume for delivery lines 16b, 16c, 36, and a lower line pressure when there is a higher volume for the delivery lines. The lowest anticipated line pressure should occur at the highest estimated volume for delivery lines 16b, 16c, 36. Since the highest estimated volume is precalculated, the graph is used to obtain the corresponding lowest anticipated pressure reading. The specific value for X is then set slightly below the lowest anticipated pressure reading. For example, a plot of line pressure versus line volume for an air burst of 0.52 seconds yields a line pressure of about 15 psi for the maximum anticipated volume for delivery lines 16b, 16c, 36. The value of X for an air burst of 0.52 seconds is thus set somewhat below 15 psi, such as at about 12 psi.

As additional examples, plots of line pressure versus line volume for other air bursts described in step 232 lead to the following values for X: for an air burst of about 0.65 seconds, a line pressure of about 20 psi corresponds to the maximum anticipated volume, leading to a value of about 15 psi for X; for an air burst of about 0.78 seconds, a line pressure of about 25 psi corresponds to the maximum anticipated volume, leading to a value of about 18 psi for X; for an air burst of about 0.91 seconds, a line pressure of about 27 psi corresponds to the maximum anticipated volume, leading to a value of about 20 psi for X; and for an air burst of about 1.04 seconds, a line pressure of about 31 psi corresponds to the maximum anticipated volume, leading to a value of about 20 psi for X.

As a result, if the pressure indicated by delivery transducer 28 in step 246 is above X, controller 42 proceeds to determine the size of air bursts that are to be used in a step-up procedure to check the pressure in tire 14, to be described below. However, if delivery transducer 28 indicates a pressure that is below desired minimum X in step 246, it must be determined if an extremely low tire pressure below X exists, or if an oversize conduit has been installed.

To make this determination, turning to FIG. 6D, with delivery solenoid 24 still energized, supply solenoid 18 is energized for a relatively long period of time, such as about two seconds, to provide an extended burst of air into delivery lines 16b, 16c, 36, step 248. Optionally, supply solenoid 18 can be energized for a period of time that is a multiple of that used for the initial air burst of step 232, such as about 2.5 times the time period used for the initial burst. Supply solenoid 18 then is closed. Delivery transducer 28 is checked by controller 42 to determine if the pressure is above desired minimum value X, step 250. If it is, the step-up check procedure described below commences. If the pressure is not above X, it must be determined approximately how low the delivery pressure is, so that an appropriate diagnosis of system 10 can be made. Controller 42 checks to see if delivery transducer 28 is reading above atmospheric pressure, taking into account a tolerance amount, such as about 3 psi, step 252.

If delivery transducer 28 indicates a pressure not above atmosphere, taking the tolerance amount into account, controller 42 checks supply transducer 22 to determine if it is indicating a reading that is at or above atmosphere, taking a tolerance amount into account, step 254. If not, delivery solenoid 24 is de-energized, step 256, and LED 46 flashes a blink code for a malfunction of supply transducer 22 and illuminates the indicator lamp, step 258. If supply transducer 22 reads a pressure that is at or above atmosphere in step 254, controller 42 checks to see if the supply transducer is indicating a pressure that is above the desired minimum value X, step 260. If it is not, controller 42 de-energizes delivery solenoid 24, step 262, and causes LED 46 to flash a blink code for a low supply pressure while the indicator lamp remains de-luminated, since the compressor may recharge tank 12, step 264. If supply transducer 22 is indicating a pressure that is above the desired minimum value X, controller 42 presumes that a line leak exists, de-energizes delivery transducer 24, step 266, and signals LED 46 to flash a corresponding blink code and illuminates the indicator lamp, step 268.

If delivery transducer 28 indicates a pressure that is above atmosphere in step 252, taking the tolerance amount into account, controller 42 checks to determine if supply transducer 22 is responding, step 351. Turning to FIG. 6C, if supply transducer 22 did not respond, controller 42 diagnoses check valve 38 according to subroutine I, step 352. If the diagnosis shows that check valve 38 is malfunctioning, delivery solenoid 24 is energized to prevent tire 14 from deflating, step 354, and LED 46 flashes a blink code for a malfunction of the check valve and the indicator lamp is illuminated, step 356. If check valve 38 is not malfunctioning, delivery solenoid 24 is de-energized to allow third pneumatic conduit section 16c and the portion of air tube assembly 16 through the check valve to vent, step 358, thereby relieving the pressure on rotary union 34, while LED 46 flashes a blink code for a malfunctioning supply transducer 22 and the indicator lamp is illuminated, step 360.

Returning to step 351 in FIG. 6D, if supply transducer 22 is responding and delivery transducer 28 reads above atmosphere, controller 42 checks the pressure that supply transducer 22 is reading, step 269, shown in FIG. 6E. If that pressure is above a minimum value, such as 85 psi, it is presumed that pressure protection valve 17 (FIG. 1) is open. If pressure protection valve 17 is open, supply solenoid 18 and delivery solenoid 24 are energized to fill tire 14 for a very extended period of time, such as about one minute, step 270. At the end of the tire fill in step 270, supply solenoid 18 is de-energized and a short period of time is allowed to pass so that the pressure may stabilize. Controller 42 reads the pressure indicated by delivery transducer 28, step 271, to determine if the fill increased the pressure by a minimum amount, such as about 2 psi, step 272. If the pressure did increase by the minimum amount, then an inflation process, to be described below, begins. If the pressure does not increase by the minimum amount in step 272, controller 42 diagnoses check valve 38 according to subroutine I, step 274. If the diagnosis indicates that check valve 38 is leaking, delivery solenoid 24 is energized, step 276, and LED 46 flashes the blink code for a malfunctioning check valve, while the indicator lamp is illuminated, step 278. If check valve 38 is determined not to be leaking, controller 42 presumes that a line leak is present, de-energizes delivery solenoid 24, step 280, and activates the appropriate blink code for LED 46, while illuminating the indicator lamp, step 282.

Returning to step 269, if supply transducer 22 reads a value that is below the minimum amount of 85 psi, indicating a closed pressure protection valve, controller 42 diagnoses check valve 38 according to subroutine I, step 284. If check valve 38 is determined to be malfunctioning, controller 42 energizes delivery solenoid 24 to prevent tire 14 from deflating, step 286, and causes LED 46 to flash the blink code for a malfunctioning check valve and illuminates the indicator lamp, step 288. If check valve 38 is not malfunctioning, controller 42 de-energizes delivery solenoid 24 to vent exhaust, step 290, and causes LED 46 to flash a blink code for a low supply pressure, while de-luminating the indicator lamp, step 292, since the compressor may fill tank 12.

Figure 6J:
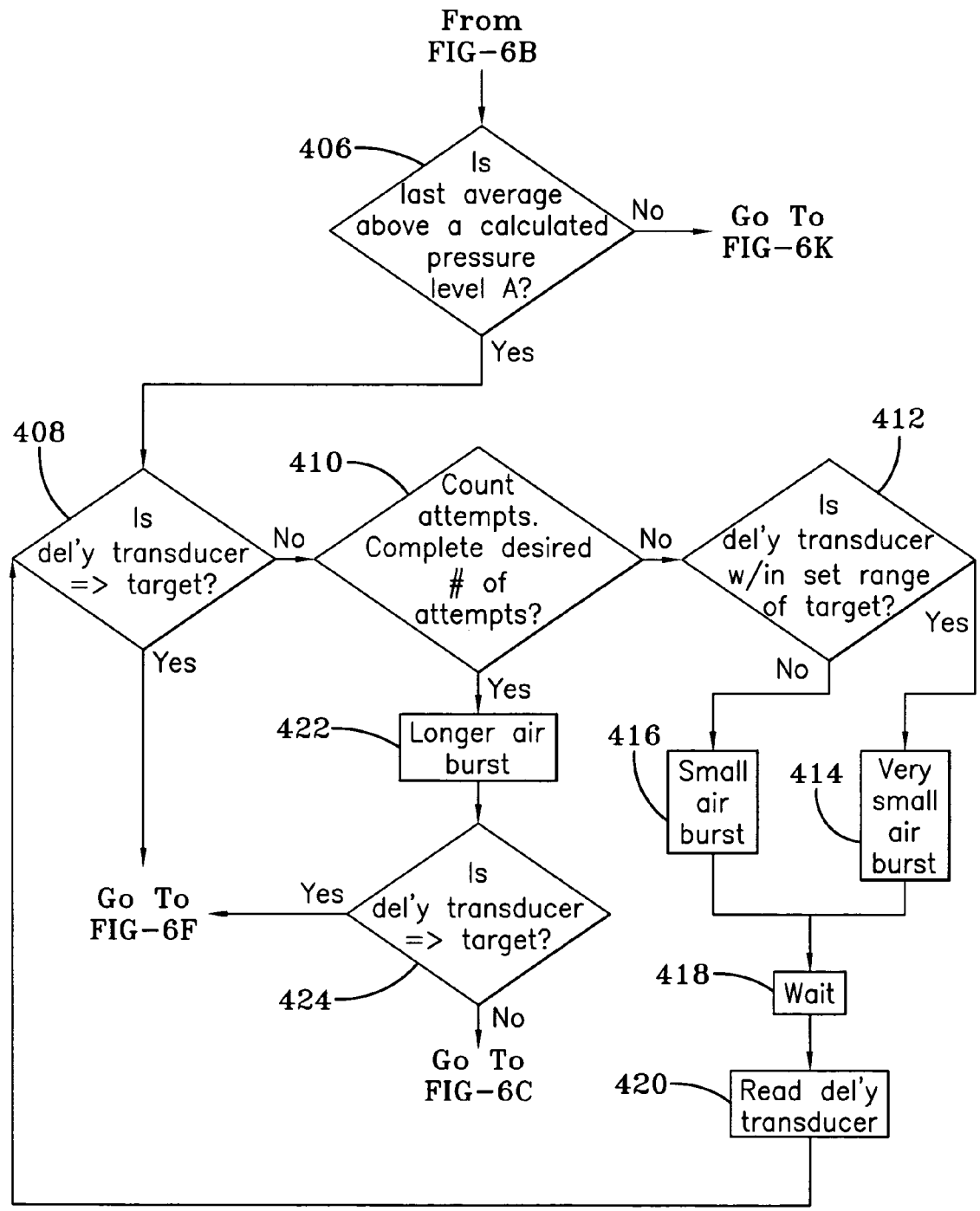
Figure 6K:
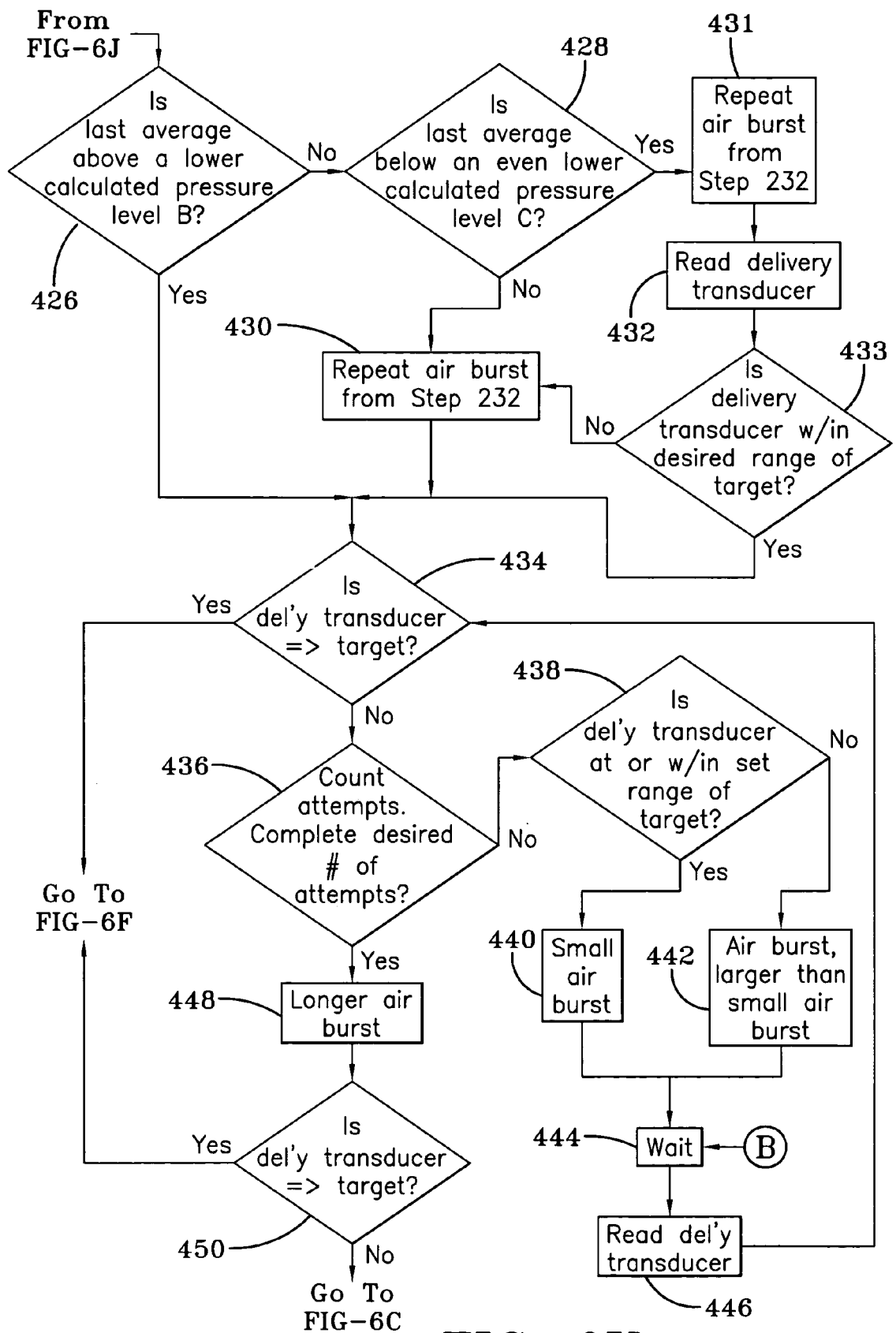

Returning to step 246 in FIG. 6B, if the pressure in pneumatic conduit section 16c is above the desired minimum X after the air burst of step 232, in which the integrity of delivery lines 16b, 16c, 36 is checked, the step-up check of tire pressure commences. Turning now to FIG. 6J, the specific size of air bursts for the step-up procedure is determined. Controller 42 evaluates whether the average of the second series of pressure readings indicated by delivery transducer 28 in step 238 is greater than a calculated pressure level A, step 406. To establish pressure level A, the plot of line pressure versus line volume for a specific duration air burst from step 232, described above, is used. Because the graph is a decreasing-function curve, a higher line pressure corresponds to a smaller volume for delivery lines 16b, 16c, 36, while a lower line pressure corresponds to a larger delivery line volume. To arrive at pressure level A, the volume of typical smaller-volume configurations for system 10, such as those used on single axle or small tandem axle configuration, can be calculated and set as a volumetric limit. Reference to the graph then provides the pressure level for that volumetric limit, which is pressure level A. Thus, if the reading indicated by delivery pressure transducer 28 is above level A, controller 42 presumes that system 10 is installed on a smaller-volume axle configuration and proceeds using relatively short, or small, air bursts for the step-up check of tire pressure.

Exemplary values for pressure level A include: about 32 psi for an air burst of about 0.52 seconds in step 232; about 39 psi for an air burst of about 0.65 seconds in step 232; about 43 psi for an air burst of about 0.78 seconds in step 232; about 58 psi for an air burst of about 0.91 seconds in step 232; and about 73 psi for an air burst of about 1.04 seconds in step 232.

If delivery transducer 28 indicates a reading that is above pressure level A, controller 42 determines if the delivery transducer is indicating a pressure that is either at the target tire inflation pressure, taking into account a tolerance amount, such as about 2 psi, or greater than the target inflation pressure, step 408. If the air pressure in tire 14 is less than that in delivery lines 16b, 16c, 36, air rolls past check valve 38 and delivery transducer 28 indicates a stable pressure after multiple air addition pulses. If the air pressure in tire 14 is at the target, the bias of check valve 38 will not be overcome, allowing the pressure in third pneumatic conduit section 16c to reach the target pressure. Thus, if the pressure reading is at or above the target pressure for tire 14 in step 408, controller 42 shuts system 10 down, to be described below.

If the reading of delivery transducer 28 indicates that the tire pressure is below the target pressure, again taking a tolerance amount into account, the step-up procedure commences. Controller 42 sets a counter to keep track of a desired number of air bursts, or attempts, such as 30 attempts, step 410. Controller 42 then determines if the pressure reading indicated by delivery transducer 28 is within a set range of the target inflation pressure, such as within about 7 psi of the target, step 412. If the pressure reading is within about 7 psi of the target, controller 42 energizes both supply solenoid 18 and delivery solenoid 24 for a very brief period, such as about 0.033 seconds, step 414, which allows a very small burst of compressed air to enter second pneumatic conduit section 16b and third conduit section 16c. Supply solenoid 18 then is de-energized, thus keeping the pulse of air contained in second and third pneumatic conduit sections and the portion of air tube assembly 36 up through check valve 18. If the pressure reading in step 412 is not within about 7 psi of the target, controller 42 energizes supply solenoid and delivery solenoid 24 for a brief period, such as about 0.065 seconds, step 416, which allows a small burst of compressed air to enter second pneumatic conduit section 16b and third conduit section 16c, and then the controller de-energizes the supply solenoid. In each case, the pulse of air is small enough to prevent elevation of the pressure in tire 14 over the target air pressure.

Once the respective burst of air is sent into second and third conduit sections 16b, 16c, controller waits for a brief period of time for system 10 to stabilize, step 418, and reads delivery transducer 28 again, step 420. Step 408 is then repeated, as controller 42 determines if the pressure reading is equal to or above the target inflation pressure, accounting for the tolerance amount. If the reading is still below the target, the previous air burst is counted, step 410. If the desired limit of small bursts has not been reached, delivery pressure transducer 28 repeats the air burst and reading in steps 412-420 and again returns to step 408. This process of stepping up pressure with very small or small bursts of air continues either until the target pressure is reached in second and third pneumatic conduits 16b, 16c, or until the desired limit of about thirty bursts of air have been added, as determined in step 410.

If about thirty bursts of air have been added without reaching the target pressure, supply solenoid 18 is energized for a longer period of time, such as about 1.5 seconds, and then de-energized, step 422, to allow system 10 to check if oversized lines were installed. Controller 42 then checks the pressure indicated by delivery transducer 28, step 424. If the pressure is at or above the target, again taking into account a tolerance amount, such as about 2 psi, system 10 shuts down according to the steps described below. However, if delivery transducer 28 indicates that the pressure is still below the target, controller 42 checks the pressure indicated by supply transducer 22, step 374, shown in FIG. 6C and also described below.

However, before proceeding to step 374 in FIG. 6C, reference is made to step 406 in FIG. 6J. If the last average pressure reading from the air burst in step 232 is not above pressure level A, controller 42 determines if that pressure reading is above a lower pressure reading B, step 426, shown in FIG. K. Pressure level B is determined in a manner similar to that used to determine pressure level A, described above, using the plot of line pressure versus line volume for a specific duration air burst from step 232. As previously mentioned, the graph is a decreasing-function curve, wherein a higher line pressure corresponds to a smaller volume for delivery lines 16b, 16c, 36 and a lower line pressure corresponds to a larger delivery line volume. Pressure level A is determined by calculating the volumetric limit of typical smaller-volume axle configurations for system 10 and then obtaining the pressure level that corresponds to that volumetric limit. Pressure level B is determined by calculating the volumetric limit of medium-sized axle configurations, such as larger tandem systems and tridem systems. A volumetric limit for such medium-sized axle configurations is established and the corresponding pressure level, pressure level B, is obtained by referencing the graph. Of course, since higher volumes correspond to lower pressure levels, pressure level B is lower than pressure level A.

Once controller 42 establishes that the pressure level is above B in step 426, the step-up check of tire pressure proceeds using appropriate air bursts, as described below. Exemplary values for pressure level B include: about 25 psi for an air burst of about 0.52 seconds in step 232; about 31 psi for an air burst of about 0.65 seconds in step 232; about 38 psi for an air burst of about 0.78 seconds in step 232; about 43 psi for an air burst of about 0.91 seconds in step 232; and about 57 psi for an air burst of about 1.04 seconds in step 232.

If the last average pressure reading from the air burst in step 232 is not above pressure level B in step 426, but it is above the minimum value X in step 246, controller 42 presumes that air should be added to delivery lines 16b, 16c, 36 before proceeding to the step-up check. The amount of air to be added depends on whether the pressure reading is below an even lower pressure level C, step 428. Pressure level C is determined in a manner similar to that as used for pressure levels A and B. More particularly, pressure level C is determined by calculating the volumetric limit of larger-sized axle configurations, such as quad systems. A volumetric limit for such larger-sized configurations is established and the corresponding pressure level, pressure level C, is obtained by referencing the plot of line pressure versus line volume for a given duration air burst. Since higher volumes correspond to lower pressure levels, pressure level C is lower than pressure level B.

If the pressure reading is at or greater than level C, the air burst provided in step 232 is repeated, such as one time, step 430, before proceeding to the step-up check. If the pressure reading is below level C, the air burst provided in step 232 is repeated, such as one time, step 431. Then, delivery transducer 28 is read again, step 432, and if the reading is within a desired range of the target inflation pressure, such as within 20 psi of the target, step 433, the step-up check commences. If the reading is not within the desired range of the target, the air burst from step 232 is repeated again, such as one more time, step 430, before proceeding to the step-up check. Exemplary values for pressure level C include: about 17 psi for an air burst of about 0.52 seconds in step 232; about 22 psi for an air burst of about 0.65 seconds in step 232; about 25 psi for an air burst of about 0.78 seconds in step 232; about 28 psi for an air burst of about 0.91 seconds in step 232; and about 42 psi for an air burst of about 1.04 seconds in step 232.

Once the applicable air bursts in steps 430-433 have been provided, or if the pressure reading is above level B in step 426, controller 42 determines if the delivery transducer is indicating a pressure that is either at the target tire inflation pressure, taking into account a tolerance amount, such as about 2 psi, or greater than the target inflation pressure, step 434. If the pressure reading is at or above the target pressure controller 42 shuts system 10 down, to be described below.

If the reading of delivery transducer 28 indicates that the tire pressure is below the target pressure, again taking a tolerance amount into account, the step-up procedure commences. Controller 42 sets a counter to keep track of a desired number of air bursts, or attempts, such as 30 attempts, step 436. Controller 42 then determines if the pressure reading indicated by delivery transducer 28 is within a set range of the target inflation pressure, such as within about 10 psi of the target, step 438. If the pressure reading is within about 10 psi of the target, controller 42 energizes both supply solenoid 18 and delivery solenoid 24 for a brief period, such as about 0.065 seconds, step 440, which allows a small burst of compressed air to enter second pneumatic conduit section 16b and third conduit section 16c. Supply solenoid 18 then is de-energized, thus keeping the pulse of air contained in second and third pneumatic conduit sections and the portion of air tube assembly 36 up through check valve 18. If the pressure reading in step 438 is not within about 10 psi of the target, controller 42 energizes supply solenoid and delivery solenoid 24 for a slightly longer period, such as about 0.130 seconds, step 442, which allows a larger burst of compressed air to enter second pneumatic conduit section 16b and third conduit section 16c, and then the controller de-energizes the supply solenoid. In each case, the pulse of air is small enough to prevent elevation of the pressure in tire 14 over the target air pressure.

Once the respective burst of air is sent into second and third conduit sections 16b, 16c, controller waits for a brief period of time for system 10 to stabilize, step 444, and reads delivery transducer 28 again, step 446. Step 434 is then repeated, as controller 42 determines if the pressure reading is equal to or above the target inflation pressure, accounting for the tolerance amount. If the reading is still below the target, the previous air burst is counted, step 436. If the desired limit of small bursts has not been reached, delivery pressure transducer 28 repeats the air burst and reading in steps 438-446 and again returns to step 434. This process of stepping up pressure with small or slightly larger bursts of air continues either until the target pressure is reached in second and third pneumatic conduits 16b, 16c, or until the desired limit of about thirty bursts of air have been added, as determined in step 436.

If about thirty bursts of air have been added without reaching the target pressure, supply solenoid 18 is energized for a longer period of time, such as about 1.5 seconds, and then de-energized, step 448, to allow system 10 to check if oversized lines were installed. Controller 42 then checks the pressure indicated by delivery transducer 28, step 450. If the pressure is at or above the target, again taking into account a tolerance amount, such as about 2 psi, system 10 shuts down according to the steps described below. However, if delivery transducer 28 indicates that the pressure is still below the target, controller 42 checks the pressure indicated by supply transducer 22, step 374, shown in FIG. 6C and also described below.

If delivery transducer 28 indicates that the pressure is still below the target after completing the desired number of air bursts for the step-up check, controller 42 checks the pressure indicated by supply transducer 22, step 374, shown in FIG. 6C. If the pressure indicated by supply transducer 22 is greater than that indicated by delivery transducer 28, taking a tolerance amount into account, such as from about 3 psi to about 5 psi, controller 42 presumes that tire 14 is low in air pressure and commences the tire inflation procedure described below. With continuing reference to FIG. 6C, if the pressure indicated by supply transducer 22 is not greater than that indicated by delivery transducer 28, controller 42 verifies that the supply transducer is reading at least atmospheric pressure, step 376. If transducer 22 is reading at least atmospheric pressure, controller 42 checks for a leaking check valve 38 according to subroutine I, step 378, and energizes delivery solenoid 24, step 380, and signals LED 46 and the indicator lamp to act if the valve is determined to be leaking, step 382. If check valve 38 is not leaking, controller 42 de-energizes delivery solenoid 24, step 384, and causes LED 46 to flash a blink code for low supply pressure and does not illuminate the indicator lamp, step 386, as the compressor may fill tank 12.

If transducer 22 is not reading at least atmospheric pressure in step 376, controller 42 checks for a leaking check valve 38 according to subroutine I, step 352. If a leaking valve 38 is found, controller 42 energizes delivery solenoid 24 to prevent tire 14 from deflating, step 354, and causes LED 46 to flash a corresponding blink code while the indicator lamp is illuminated, step 356. If check valve 38 is not leaking, controller 42 de-energizes delivery solenoid 24 to vent third pneumatic conduit section 16*c*, step 358, and causes LED to flash a blink code for a malfunction of supply transducer 22, while the indicator lamp is illuminated, step 360.

If the pressure in tire 14 is at the target pressure according to steps 364, 372 in FIG. 6B, the bias of check valve 38 is not overcome, allowing the pressure in third conduit section 16*c* to reach the target pressure level. This target pressure level is indicated by delivery transducer 28, causing controller 42 to initiate a shut-down sequence, shown in FIG. 6F. Supply solenoid 18 and delivery solenoid 24 are both de-energized, causing third pneumatic conduit section 16*c* and air tube assembly 36 up through check valve 38 to vent to atmosphere, step 296, thereby relieving the air pressure on rotary union 34. After a short period of time, such as about 5 seconds, controller 42 diagnoses check valve 38 according to subroutine I, step 298. If check valve 42 is determined not to be leaking, delivery solenoid 24 is de-energized, step 300, and system 10 shuts down. Of course, after a predetermined amount of time, such as about ten minutes, step 302, system 10 is re-energized by controller 42 and the method re-commences. If controller 42 detects a malfunctioning check valve 38, delivery solenoid 24 is energized to seal the exhaust, step 304, LED flashes the appropriate blink code and the trailer lamp is illuminated, step 306.

Turning now to FIG. 6G, if controller 42 detects that tire 14 has an air pressure which is below the target value, an extended-pulse inflation procedure commences. The extended-pulse procedure includes determining if the last reading of delivery transducer 28 indicates a pressure more than a set amount, Z, below the target, step 308. For example, Z may be about 10 psi. If the last reading is more than about 10 psi below the target, LED 46 flashes an error code for low tire pressure and the indicator lamp is illuminated, step 310. Tire 14 is filled for a set number of seconds, Y, such as about 10 seconds, by energizing supply solenoid 18 and delivery solenoid 24, step 312. Supply solenoid 18 is de-energized and delivery transducer 28 is read again, step 314. Controller 42 then sets a timer for a predetermined amount of time T, such as about 30 minutes, step 316, and repeats steps 308, 310, 312, 314. After time T has passed, if the last tire pressure reading is still more than Z psi below the target, controller 42 determines if supply transducer 22 indicates a pressure greater than that indicated by delivery transducer 28, plus a tolerance amount, such as from about 3 psi to about 5 psi, step 318. If the supply pressure is greater, delivery solenoid is de-energized, step 320, and controller diagnoses check valve 38 according to subroutine I, step 322, shown in FIG. 6H. If check valve 38 is determined to be leaking, delivery solenoid is re-energized to seal exhaust, step 324, and LED 46 flashes the corresponding error code while the indicator lamp is illuminated, step 326. If check valve 38 is not leaking, delivery solenoid 24 is de-energized, step 328, and a line leak is presumed by controller 42, causing LED 46 to flash the appropriate blink code and the indicator lamp to illuminate, step 330.

Returning to step 318 in FIG. 6G, if the supply pressure is not greater than the reading of delivery transducer 28, delivery solenoid 24 is energized to vent exhaust, step 332, and controller 42 diagnoses check valve 38 according to subroutine I, step 334. If valve 38 is determined to be leaking, delivery solenoid 24 is energized, step 336, and LED 46 flashes a blink code for a check valve malfunction while the indicator lamp is illuminated, step 338. If check valve 38 is not leaking, delivery solenoid is de-energized, step 340, and LED 46 flashes a blink code for low supply pressure while the indicator lamp remains de-luminated, step 342, to allow the compressor to fill tank 12.

Returning to step 308, if the last tire pressure reading is within Z, that is, the set amount below target, tire 14 is filled for a set number of seconds, Y, step 344. As mentioned above, Z is preferably about 10 psi and Y is preferably about 10 seconds. To fill tire 14, supply solenoid 18 is energized for about 10 seconds and delivery solenoid 24 also is energized. Then, supply solenoid 18 is de-energized. Delivery transducer 24 is read again in step 346. If the pressure reading is at the target, taking a tolerance into account, step 348, controller 42 initiates the shut down sequence described above, which is shown in FIG. 6F. If the pressure reading is less than the target, controller 42 sets a timer for a predetermined amount of time T, such as about 30 minutes, step 350, and repeats steps 344, 346, 348. After time T has passed, if the pressure reading is still less than the target, system 10 commences the diagnostic routine described above starting at step 318. In this manner, the process of measuring and inflating with extended pulses continues until the target pressure in tire 14 is reached. Thus, precise control over the inflation process is established by system 10.

It is important to note that the exemplary time periods listed above are dependent upon the diameter and the length of the particular pneumatic conduit used for a specific application. Thus, the time periods provided herein are examples that are based on a typical application using industry-standard air lines, and may be adjusted depending on the conduits and the routing used, without affecting the overall scope of the invention. Furthermore, values for other variables, such as pressure ranges, cycle counts, etc., are provided herein as examples and also may be adjusted according to the specific application without affecting the overall scope of the invention.

Because the air is supplied in bursts up to the target pressure through the extended-pulse procedure, tire 14 is not over-inflated by system 10. In addition, measurement of the air pressure in tire 14 is taken at predetermined time intervals, thus allowing consistent monitoring and control of tire pressure. The tire inflation procedure of system 10 thereby provides controlled inflation of tire 14 without over-inflating the tire, thereby overcoming the disadvantages of prior art inflation systems.

Figure 7:
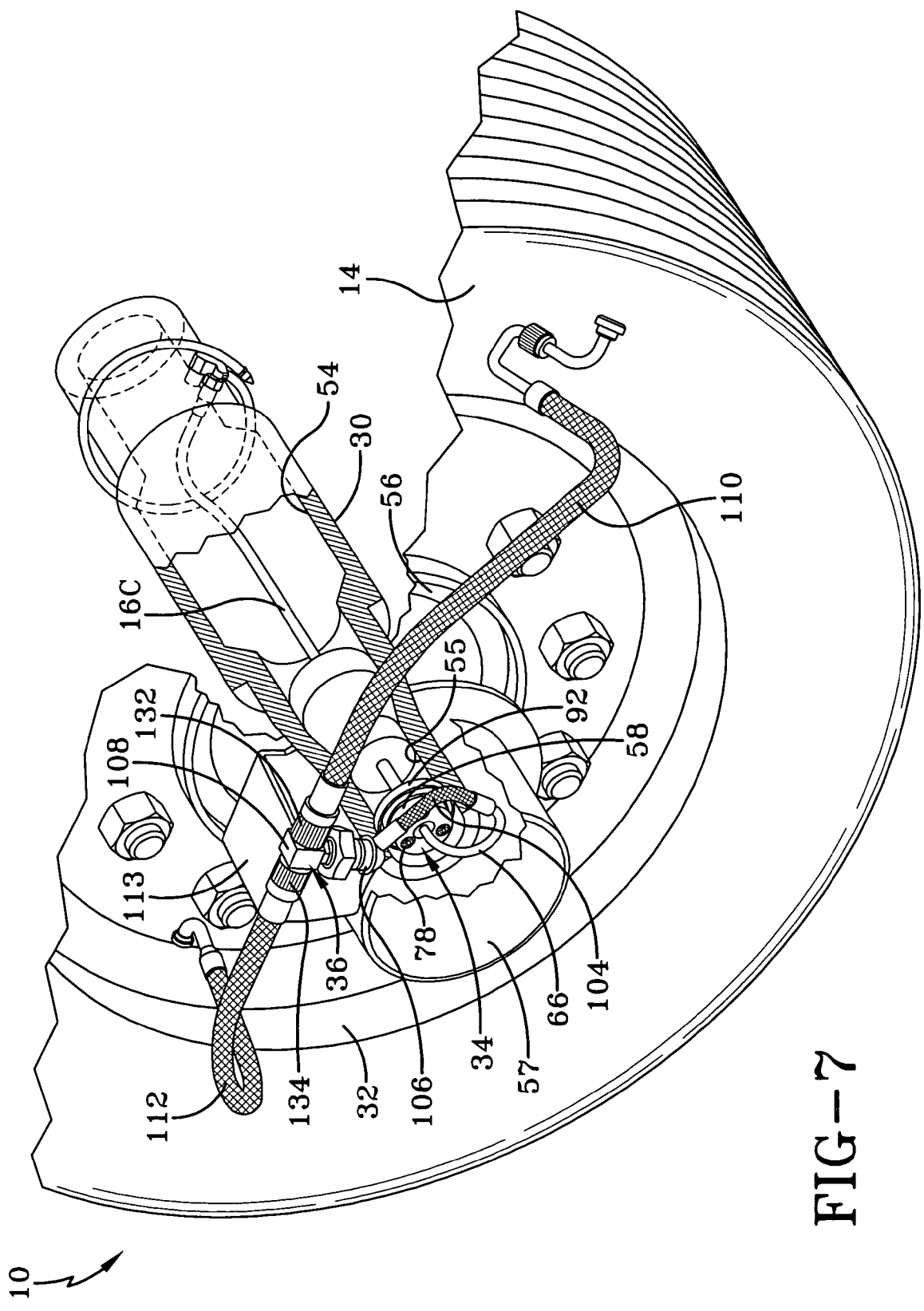
FIG. 7 is a fragmentary perspective view, with portions broken away and hidden portions represented by phantom lines, of the components of the tire inflation system of the present invention that are disposed adjacent to each vehicle wheel/tire.
Figure 8:
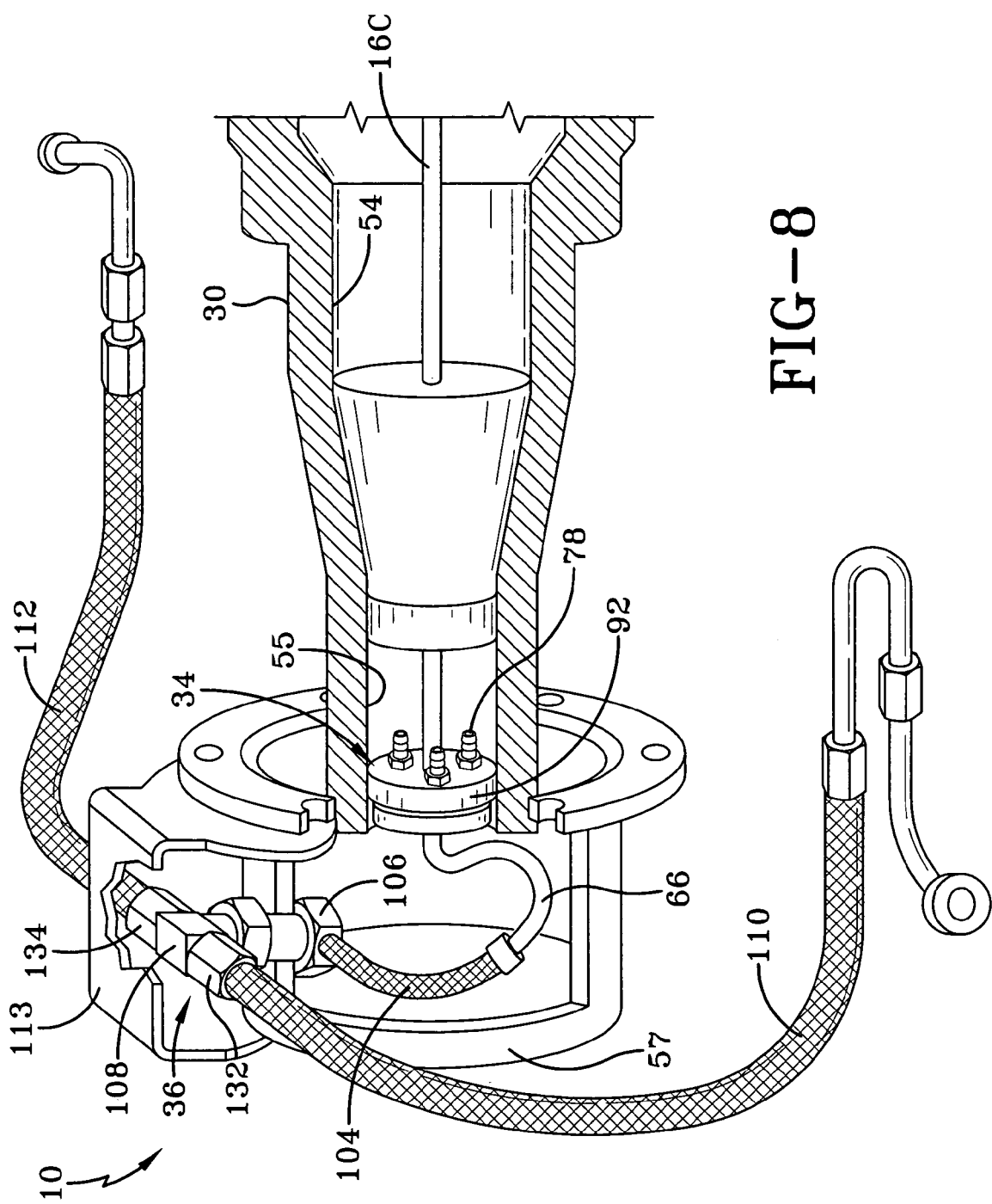
FIG. 8 is a reverse-side perspective view, with portions broken away and in section, of some of the components shown in FIG. 7.

Turning now to FIGS. 7 and 8, rotary union 34 of system 10 facilitates the connection of pneumatic conduit 16 to air tube assembly 36, which rotates with tire 14. Because of the nature of pneumatic conduit 16 extending from a relatively static environment to a rotating dynamic environment, multiple forces that may cause the failure of components are present, showing the importance of the fluid connection established by rotary union 34.

Rotary unions of the prior art include two-piece air tubes and are clamped into the end of the axle bore. The weight of the air conduits, as well as the pre-loaded binding of attaching lines to a bulkhead fitting on the hub cap, places pressure on the fittings of the tubes. This pressure creates a load that can cause the two-piece tubes to fail. Rotary unions of the prior art also include one-piece bodies that cannot be disassembled for servicing, and attachment means that allow the unions to work free from the axle over time. Moreover, rotary unions of the prior art utilize hose barbs that allow air tubes to work free. Rotary union 34 of present invention tire inflation system 10 overcomes these disadvantages.

Wheel 32 is mounted on axle 30 in a manner known in the art, and tire 14 in turn is mounted on the wheel, also as known in the art. A central bore 54 is formed in axle 30, through which third pneumatic conduit section 16c extends toward an outboard end of the axle. Rotary union 34 is attached to a plug 92 that is press-fit in a tight-tolerance, machined section 55 of axle central bore 54 at an outboard end of axle 30 and fluidly connects to third pneumatic conduit section line 16c. A hub cap 57 is mounted on a wheel hub 56 over the outboard end of axle 30. Air tube assembly 36, which includes check valve 38 (FIG. 1), is rotatably connected to rotary union 34 under hub cap 57, passes through the hub cap, and connects to tires 14, as will be described in greater detail below.

With additional reference to FIGS. 9-11, rotary union 34 includes a cylindrical body 58 that has an inboard half 60 and an outboard half 62, with the two halves being screwed together. A central bore 64 is formed in body 58, which receives a one-piece rigid air tube 66. Rigid air tube 66 seats on bearings 68 that are housed about central bore 64, which allows the air tube to rotate with wheel 32 and tire 14 in relation to body 58. A main seal 70 also is located in body 58 about central bore 64. Three screw bores 72 are formed in body 58 along a bolt circle 74 and are spaced from one another about the bolt circle at an angle α, which preferably is 120 degrees. Each screw bore 72 includes a tapered counterbore 76, which allows associated tapered flat-head screws 78 to lie flush with an outboard surface of body 58 and to be centered in each bore 72 upon tightening. Inboard half 60 of body 58 includes an inboard hose barb 80, which will be described in greater detail below.

The two-piece construction of rotary union body 58 allows the body to be disassembled for servicing and rebuilding, such as to replace seal 70, which is not possible with the one-piece body designs of prior art rotary unions. Body halves 60, 62 are securely joined when they are screwed together, with screws 78 providing additional clamping force. Loss of air through rotary union body 58 is prevented or minimized by main seal 70 and an additional seal 82, which are positioned to seat at the interface of inboard half 60 and outboard half 62 of the body.

Rigid one-piece air tube 66 also is a part of rotary union 34, as mentioned above. Rigid tube 66 includes a first bend 84, a second bend 86, a third bend 88 and a hose barb 90. As mentioned above, in the prior art, bends in a rigid tube were facilitated by multiple-piece tubes that were threaded and screwed together. Such connections had the potential to fail over time due to the stress risers created by the threads.

To overcome such disadvantages, rigid tube 66 is a one-piece steel tube that is bent to the required shape.

Of course, it is difficult to form bends 84-88 and still keep tube 66 hard enough to withstand the forces at the end of axle 30. As a result, rigid air tube 66 is a steel tube in which bends 84-88 are formed, followed by case hardening of the tube according to processes well-known to those skilled in the art. A preferred case hardening process is melanite nitriding, which is a relatively low temperature hardening process that prevents distortion of tube 66 and increases wear resistance of the portion of the surface of the tube that is in contact with bearings 68 and main seal 70.

Figure 12:
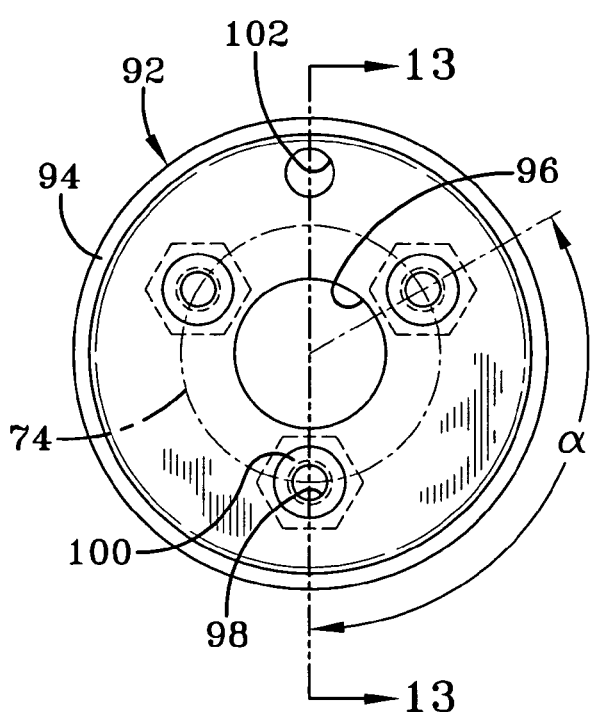
FIG. 12 is a front elevational view, with hidden portions represented by phantom lines, of an end plug of the tire inflation system of the present invention.
Figure 13:
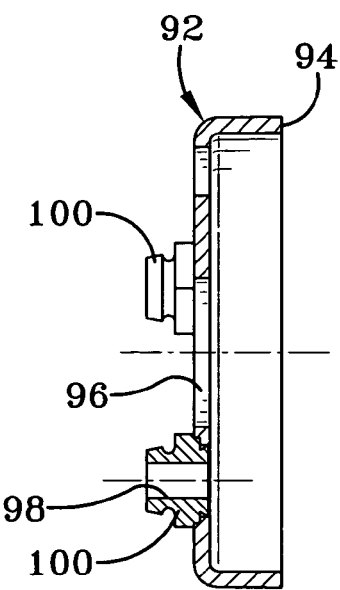
FIG. 13 is a sectional view taken along line 13-13 of FIG. 12.

With additional reference to FIGS. 12-13, end plug 92 facilitates the press fit of rotary union 34 into machined section 55 of axle central bore 54. As FIG. 7 shows, end plug 92 is pressed into machined section 55, which is a high vibration and stress area. In the prior art, some rotary unions were mounted outboard of hub cap 57, which exposed them to be possibly knocked off of axle 30. In an attempt to remedy this potential problem, other rotary unions of the prior art were located in machined section 55 of axle central bore 54, but were secured to axle 30 by plugs with a rubber housing that created a friction fit. The prior art plugs could be assembled improperly and could also work out of machined section 55 over time. The press fit of end plug 92 and the bolted attachment of rotary union body 58 to the end plug overcomes these disadvantages.

End plug 92 also allows rotary union 34 to be centered in machined section 55 of central bore 54, which reduces cyclical loading of the rotary union and leads to a longer life. The inboard surface of body 58 of rotary union 34 is positioned against an outboard surface of end plug 92 inside a lip 94 that is formed about the circumference of the end plug. A central bore 96 is formed in end plug 92 to allow inboard hose barb 80 to pass through and connect to third pneumatic conduit section 16c. Three screw holes 98 that correspond to screw bores 72 in body 58 are also formed in end plug 92, which allow screws 78 to secure body 58 to the end plug. Three torque prevailing nuts 100, which are split nuts, are located on the inboard side of end plug 92 and accept screws 78. Nuts 100 are precisely centered on bolt circle 74 and at angle α about the bolt circle to align with screws 78. The design of nuts 100 allows them to hold screws 78 in place and withstand a great deal of vibration, while also allowing the screws to be removable for servicing of rotary union 34. Moreover, the torque-prevailing feature of nuts 100 and the crimp-type interlocking fit of each nut to end plug 92 causes screws 78 to fail before the nuts, so if a screw is overtightened, it can be removed.

The press-fit design of end plug 92, also known as an interference fit, allows secure placement of rotary union 34 against the inner wall of machined section 55 of axle 30. When end plug 92 is press-fit into machined section 55, the plug incurs a hoop stress from the interference fit, which causes the plug to buckle inboardly. This buckling causes the heads of screws 78 to tip toward the centerline of axle 30. However, when screws 78 are tightened, end plug 92 is cantilevered back to a generally flat condition, causing the screws to align parallel to the centerline of axle 30. This cantilever action wedges the circumference of end plug 92 against the inner wall of machined section 55, increasing the clamping force of the plug in axle 30. It is important to note that end plug 92 also includes a through-hole 102 for pressure relief of central bore 54 of axle 30.

With reference now to FIGS. 1 and 7-11, air tube assembly 36 connects to and fluidly communicates with rigid air tube 66 of rotary union 34 to convey air from the rotary union to tires 14. It is to be understood that air tube assembly 36 includes removable components that may be alternately configured. As shown, air tube assembly 36 includes a first flexible air tube 104 that fluidly connects to rigid tube 66 and leads to a bulkhead fitting 106, which in turn fluidly connects to a tee fitting 108. From tee fitting 108, a second flexible air tube 110 extends to an outboard tire 14 and, preferably, a third flexible air tube 112 extends to an inboard tire (not shown). A check valve 38 (also shown in FIG. 19) is located at each interface between second flexible air tube 110 and tee fitting 108, and third flexible air tube 112 and the tee fitting. A guard 113 is attached to hub cap 57 and is formed over tee fitting 108 to protect the tee fitting.

Figure 14:
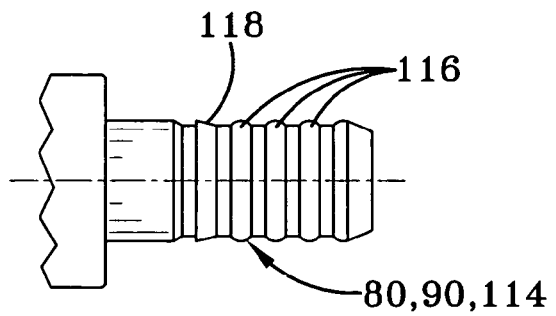
FIG. 14 is a fragmentary view looking in the direction of line 14-14 of FIG. 11 of a hose barb of the tire inflation system of the present invention.
Figure 15:
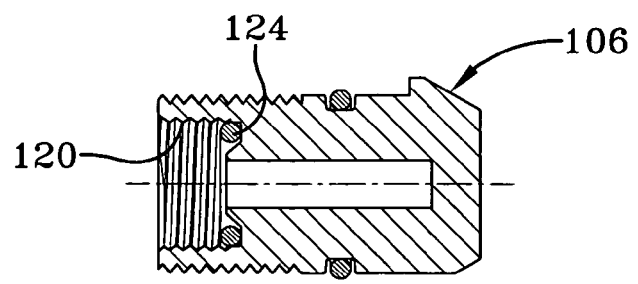
FIG. 15 is a sectional view taken along line 15-15 of FIG. 9 of a bulk head fitting of the air tube assembly of the tire inflation system of the present invention.
Figure 16:
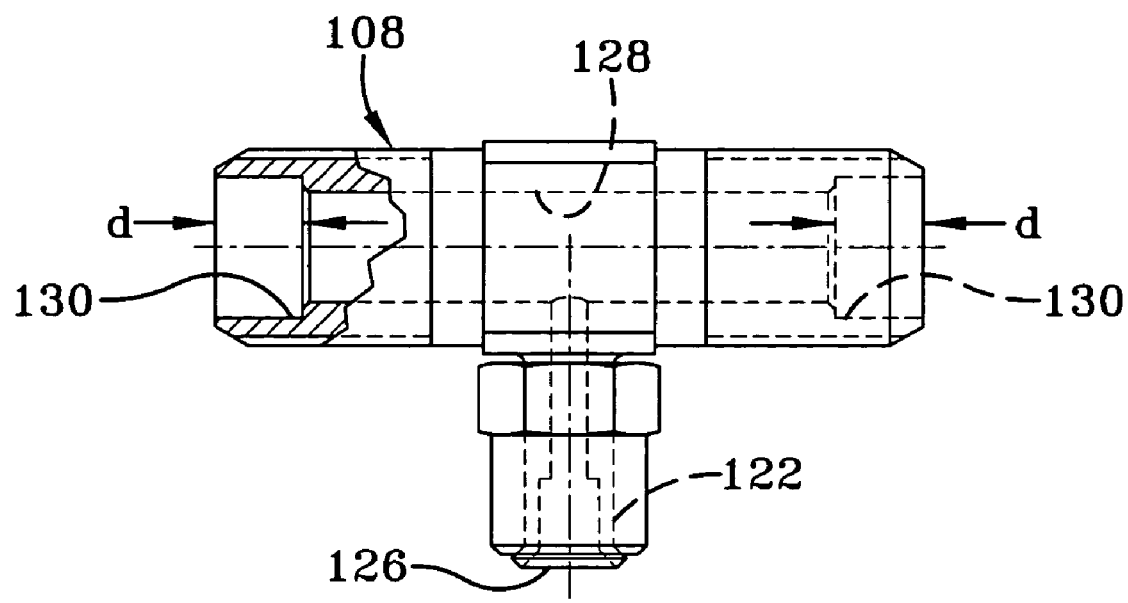
FIG. 16 is a front elevational view, with portions shown in section and hidden portions shown in phantom lines, of a tee fitting of the air tube assembly of the tire inflation system of the present invention.
Figure 17:
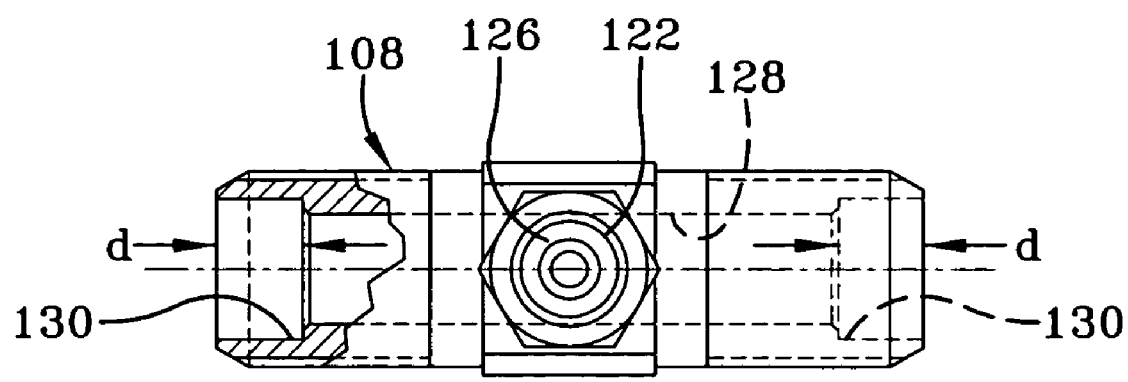
FIG. 17 is a bottom view, with portions shown in section and hidden portions shown in phantom lines, of the tee fitting shown in FIG. 16.
Figure 18:
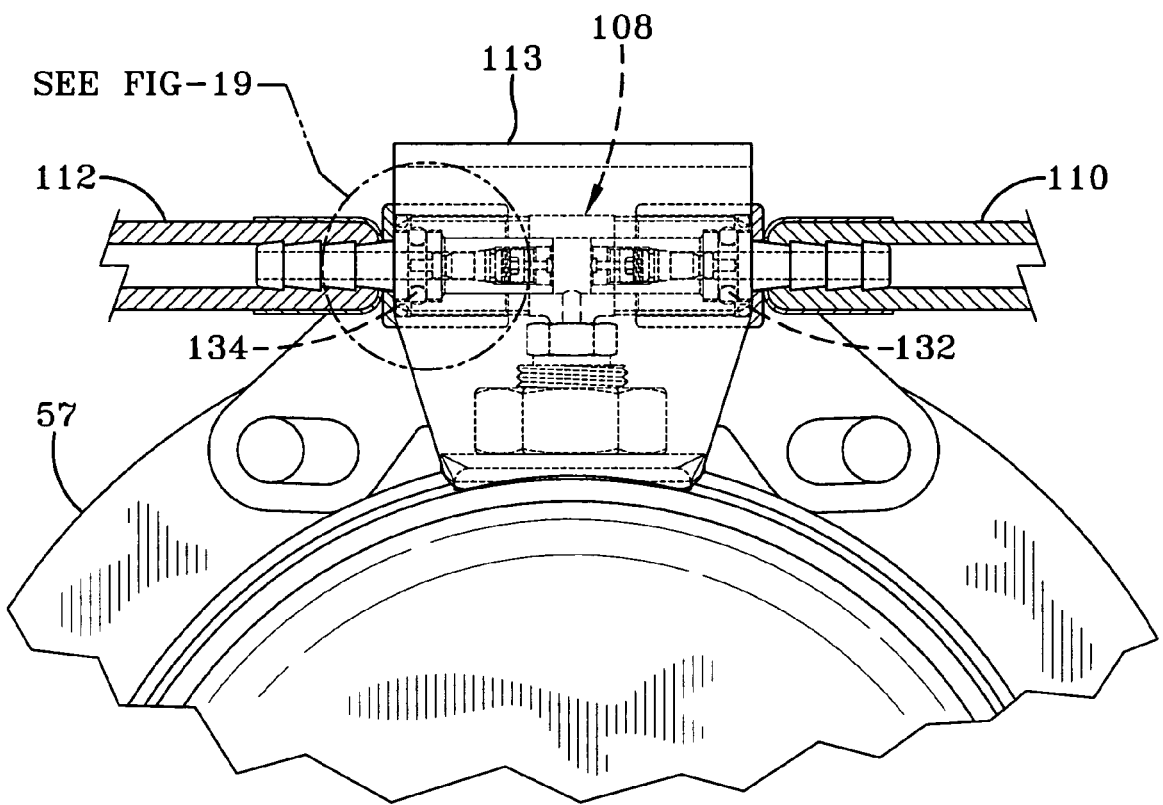
FIG. 18 is a fragmentary front elevational view, with portions shown in section and hidden portions shown in phantom lines, of a portion of a hub cap of the tire inflation system of the present invention, including a tee fitting and portions of hoses of an air tube assembly.

Third pneumatic conduit section 16c, which connects to rotary union 34, and first flexible tube 104, are typically Teflon or nylon tubes with steel braiding. Teflon and nylon are soft polymeric materials that are susceptible to cutting, but still must be firmly connected to rotary union 34 and bulkhead fitting 106. These connections are made with hose barb 80 on body 58 of rotary union 34, hose barb 90 on rigid air tube 66 of the rotary union, and a hose barb 114 on bulkhead fitting 106. In the prior art, all individual barbs on a hose barb were rounded to refrain from cutting the Teflon or nylon of the associated tubes and thus improve fatigue life in this high-vibration location, but the rounded barbs allowed the tubes to eventually slip off. Turning to FIG. 14, hose barbs 80, 90, 114 of tire inflation system 10 include distal barbs 116 that are rounded and a single proximal barb 118 with a sharp edge. Proximal barb 118 allows hose barbs 80, 90, 114 to securely hold tubes 28, 104, yet is remote from any high-flex area, reducing any tendency of the sharp proximal barb to tear the Teflon or nylon of the tubes.

Referring now to FIGS. 7-9 and 15-17, bulkhead fitting 106 includes a threaded counterbore 120 that receives a male member 122 of tee fitting 108. In the prior art, the connection between a bulkhead fitting and a tee was an unsealed metal-to-metal connection, which could allow air to leak up the threads of the tee or through the metal-to-metal joint. Any air leak up through the threads of the tee was stopped by the use of Teflon tape, but the leak at the metal-to-metal joint was not remedied. Bulkhead fitting 106 of tire inflation system 10 includes a sealing ring 124, such as an O-ring, which is positioned at the base of counterbore 120. Thus, when male member 122 of tee fitting 108 is inserted into counterbore 120 of bulkhead fitting 106, O-ring 124 surrounds a flared end 126 of the male member and acts as a redundant seal in series with the metal-to-metal joint between the bulkhead fitting and the tee fitting to reduce air leakage.

Also, as shown in FIGS. 7-8 and 16-19, tee fitting 108 includes an air channel 128 that allows air to pass from bulkhead fitting 106 to second and third flexible air tubes 110, 112. A counterbore 130 is formed in tee fitting 108 about each air channel 128 at the interface location of the tee and a respective shoulder fitting 132 and 134 of each of second and third flexible air tubes 110, 112 to facilitate connection of the tubes to the tee fitting. Counterbores of the prior art were relatively deep and allowed air tubes 110, 112 to rotate, potentially contributing to failure in the long term. Counterbores 130 of the invention are relatively shallow, being of a depth d that causes shoulder fittings 132, 134 to bottom out, thereby fixing each air tube 110, 112 in place to prevent or reduce the tendency of the tubes to rotate. This is referred to as a face-clamp technique, which functions to solidly capture shoulder fittings 132, 134 of each of second and third flexible air tubes 110, 112 to reduce rotation and vibration, extending the life of each tube.

Tire inflation system 10 thus provides an apparatus and method for more reliable monitoring and control of the tire inflation process. In particular, the tire inflation procedure of system 10 accomplishes a more extensive monitoring of tire pressure than systems of the prior art and the extended-pulse inflation procedure of the system leads to a rapid, yet controlled inflation of tire 14 without over-inflating the tire. Tire inflation system 10 also provides for communication of system problems without the need for a PC and a configuration of components and a procedure to detect and compensate for a malfunctioning check valve, thereby preventing unintended deflation of a tire 14. Furthermore, tire inflation system 10 provides for the use of a longer air pulse if the target tire pressure is not readily reached, to prevent improper inflation if oversize lines are installed or other problems are present in the system.

Moreover, tire inflation system 10 includes an improved rotary union 34, which increases the life and the stability of the system. The two-piece construction of rotary union body 58 allows rotary union 34 to be disassembled for servicing, while rigid one-piece tube 66 overcomes the tendency of prior art two-piece tubes to fail at the joint between the tubes. Rotary union 34 of tire inflation system 10 is fastened to press-fit plug 92, preventing the rotary union from working out of axle 30. Hose barbs 80, 90, 114 of tire inflation system 10 include a sharp barb 118 to securely hold Teflon or nylon air tubes in place without destroying the integrity of the tubes, while additional air leaks are curtailed by O-ring 124 between bulkhead 106 and tee fitting 108.

In this manner, tire inflation system 10 of the invention provides a more accurate and dependable system than is found in the prior art, leading to distinct economic and safety advantages. Tire inflation system 10 provides a configuration of components that allows more extensive monitoring and more reliable control of the tire inflation process and the ability to detect and compensate for a malfunctioning check valve, thereby overcoming the disadvantages of prior art systems.

Accordingly, the tire inflation system apparatus and method of the present invention is simplified, provides an effective, safe, inexpensive and efficient structure and method which achieves all the enumerated objectives, provides for eliminating difficulties encountered with prior tire inflation system apparatus and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the tire inflation system is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A method of inflating a tire, said method comprising the steps of:

providing an air supply source in fluid communication with said tire by means of a pneumatic conduit;

providing a tire pressure retention valve in said pneumatic conduit adjacent to said tire;

determining an inflation pressure of the tire with a step-up procedure, whereby air bursts of a generally predetermined volume are communicated from said air supply source to a portion of the pneumatic conduit between the air supply source and said tire pressure retention valve;

inflating said tire with an extended-pulse procedure, whereby extended bursts of air are communicated from said air supply source to the tire; and performing a shut-down sequence once a predetermined target inflation pressure in said tire is reached, whereby over-inflation of the tire generally is prevented by said method steps.

2. The method of inflating a tire of claim 1, further comprising the step of verifying the proper functioning of said tire pressure retention valve.

3. The method of inflating a tire of claim 2, wherein the step of verifying the proper functioning of said tire pressure retention valve includes the steps of:

providing a first valve in fluid communication with said pneumatic conduit between said air supply source and said tire pressure retention valve;

providing a second valve in fluid communication with said pneumatic conduit between said first valve and said tire pressure retention valve;

sealing the portion of said pneumatic conduit between said first valve and said tire pressure retention valve;

reading the pressure in said sealed portion of said pneumatic conduit a first time;

determining if said first pressure reading indicates increasing pressure in said sealed portion of said pneumatic conduit;

if said first reading indicates increasing pressure, opening said first valve, whereby a burst of air is communicated from said supply source to said tire pressure retention valve, thereby attempting to re-seat said tire pressure retention valve;

closing said first valve;

reading the pressure in said sealed portion of said pneumatic conduit a second time;

determining if said second pressure reading indicates increasing pressure in said sealed portion of said pneumatic conduit; and if said second reading indicates increasing pressure in said sealed portion of said pneumatic conduit, keeping said sealed portion of said pneumatic conduit sealed.

4. The method of inflating a tire of claim 1, further comprising the step of diagnosing said system to determine if a leak in said tire pressure retention valve exceeds a vent capacity of said system.

5. The method of inflating a tire of claim 4, wherein the step of diagnosing said system includes the steps of:

providing a first valve in fluid communication with said pneumatic conduit between said air supply source and said tire pressure retention valve;

venting the portion of said pneumatic conduit between said first valve and said tire pressure retention valve;

reading the pressure in said portion of said pneumatic conduit between said first valve and said tire pressure retention valve a first time;

sealing said portion of said pneumatic conduit between said first valve and said tire pressure retention valve;

reading the pressure in said pneumatic conduit between said first valve and said tire pressure retention valve a second time;

determining if said second reading is higher than said first reading; and if said second reading is higher than said first reading, diagnosing said tire pressure retention valve.

6. The method of inflating a tire of claim 1, further comprising the step of checking the integrity of a portion of said pneumatic conduit.

7. The method of inflating a tire of claim 6, wherein the step of checking the integrity of a portion of said pneumatic conduit includes the steps of:

providing a first valve in fluid communication with said pneumatic conduit between said air supply source and said tire pressure retention valve;

providing a second valve in fluid communication with said pneumatic conduit between said first valve and said tire pressure retention valve;

sealing the portion of said pneumatic conduit between said first valve and said tire pressure retention valve;

opening said first valve, whereby a burst of air is communicated to said sealed portion of the pneumatic conduit;

closing said first valve;

reading the pressure in said sealed portion of said pneumatic conduit a first time;

waiting for a predetermined amount of time;

reading the pressure in said sealed portion of said pneumatic conduit a second time;

comparing said first and second readings; and if said second reading is lower than said first reading, venting the portion of said pneumatic conduit between said first valve and said tire pressure retention valve to atmosphere.

8. The method of inflating a tire of claim 7, wherein a volume of said burst of air that is communicated to said sealed portion of said pneumatic conduit when said first valve is opened is related to a target inflation pressure of said tire.

9. The method of inflating a tire of claim 1, wherein the method further comprises the step of verifying the proper functioning of a pressure indicator, including the steps of:

providing a controllable valve in fluid communication with said pneumatic conduit between said air supply source and said tire pressure retention valve;

providing a pressure indicator in fluid communication with said pneumatic conduit between said controllable valve and said tire pressure retention valve;

venting to atmosphere the portion of said pneumatic conduit between said controllable valve and said tire pressure retention valve;

reading the pressure in said vented portion of the pneumatic conduit with said pressure indicator a first time;

determining if said first pressure reading is above atmospheric pressure by at least a predetermined amount;

if said first pressure reading is above atmospheric pressure by at least a predetermined amount, cycling said controllable valve;

reading the pressure in said vented portion of the pneumatic conduit with said pressure indicator a second time; and if said second pressure reading is above atmospheric pressure by at least a predetermined amount, activating a warning light system.

10. The method of inflating a tire of claim 1, further comprising the steps of:

diagnosing selected system components; and activating a warning light system if said diagnosis indicates a problem.

11. The method of inflating a tire of claim 1, wherein the step of determining the inflation pressure of said tire with a step-up procedure includes the steps of:
  providing a first valve in fluid communication with said pneumatic conduit between said air supply source and said tire pressure retention valve;
  providing a second valve in fluid communication with said pneumatic conduit between said first valve and said tire pressure retention valve;
  sealing the portion of said pneumatic conduit between said first valve and said tire pressure retention valve;
  opening said first valve for a first period of time, whereby a first burst of air is communicated to said sealed portion of said pneumatic conduit;
  closing said first valve;
  reading the pressure in said sealed portion of said pneumatic conduit a first time;
  determining if said first pressure reading is at a target inflation pressure;
  if said first pressure reading is at said target inflation pressure, shutting said tire inflation system down;
  if said first pressure reading is below said target inflation pressure:
    opening said first valve for a second period of time, whereby a second burst of air is communicated to said sealed portion of said pneumatic conduit;
    closing said first valve;
    reading the pressure in said sealed portion of said pneumatic conduit a second time;
    determining if said second pressure reading is below said target inflation pressure; and
    if said second pressure reading is below said target inflation pressure, repeating said steps of opening said first valve for a second period of time, closing said first valve, reading the pressure in said sealed portion of said pneumatic conduit a second time, and determining if said second pressure reading is below said target inflation pressure.

12. The method of inflating a tire of claim 11, further comprising the steps of:
  counting the number of air bursts communicated to said sealed portion of said pneumatic conduit; and
  if said target inflation pressure is not reached within a predetermined number of bursts, opening said first valve for a third period of time.

13. The method of inflating a tire of claim 11, wherein a determination of a volume of at least one of said first and said second bursts of air includes the steps of:
  calculating a pressure level with reference to a volume of said sealed portion of said pneumatic conduit;
  comparing at least one of said pressure readings to said calculated pressure level; and
  correlating an operation of at least one of said valves to the result of said comparison.

14. The method of inflating a tire of claim 1, wherein the step of determining the inflation pressure of said tire with a step-up procedure includes an oversize line check sequence, comprising the steps of:
  providing a first valve in fluid communication with said pneumatic conduit between said air supply source and said tire pressure retention valve;
  providing a second valve in fluid communication with said pneumatic conduit between said first valve and said tire pressure retention valve;
  sealing the portion of said pneumatic conduit between said first valve and said tire pressure retention valve;
  opening said first valve for a first period of time, whereby a first burst of air is communicated to said sealed portion of said pneumatic conduit;
  closing said first valve;
  reading the pressure in said sealed portion of said pneumatic conduit a first time;
  determining if said first pressure reading is more than a predetermined amount below a target inflation pressure;
  if said first pressure reading is more than a predetermined amount below said target inflation pressure, opening said first valve for a second period of time, whereby a second burst of air is communicated to said sealed portion of said pneumatic conduit.

15. The method of inflating a tire of claim 14, wherein said predetermined amount relates to a volume of a selected section of said conduit.

16. The method of inflating a tire of claim 1, wherein the step of inflating the tire with an extended-pulse procedure includes the steps of:
  providing a first valve in fluid communication with said pneumatic conduit between said air supply source and said tire pressure retention valve;
  providing a second valve in fluid communication with said pneumatic conduit between said first valve and said tire pressure retention valve;
  sealing the portion of said pneumatic conduit between said first valve and said tire pressure retention valve;
  opening said first valve for a first period of time, whereby a first burst of air is communicated to said sealed portion of said pneumatic conduit;
  closing said first valve;
  reading the pressure in said sealed portion of said pneumatic conduit a first time;
  if said first pressure reading is less than a target inflation pressure:
    opening said first valve for a second period of time, whereby a second burst of air is communicated to said sealed portion of said pneumatic conduit;
    closing said first valve;
    reading the pressure in said sealed portion of said pneumatic conduit a second time;
    determining if said second pressure reading is below said target inflation pressure;
    if said second pressure reading is below said target inflation pressure, repeating said steps of opening said first valve for a second period of time, closing said first valve, reading the pressure in said sealed portion of said pneumatic conduit a second time, and determining if said second pressure reading is below said target inflation pressure; and
  terminating said inflation procedure when the pressure in said sealed portion of said pneumatic conduit is at said target inflation pressure.

17. The method of inflating a tire of claim 16, further comprising the steps of:
  monitoring the time spent repeating said steps of opening said first valve for a second period of time, closing said first valve, reading the pressure in said sealed portion of said pneumatic conduit a second time, and determining if said second pressure reading is below said target inflation pressure; and
  if said monitored time exceeds a predetermined amount of time, diagnosing said tire inflation system.

18. The method of inflating a tire of claim 16, further comprising the steps of:
- determining if said first pressure reading is more than a predetermined amount below said target inflation pressure;
- if said first pressure reading is more than a predetermined amount below said target inflation pressure:
  - opening said first valve for a third period of time, whereby a third burst of air is communicated to said sealed portion of said pneumatic conduit;
  - closing said first valve;
  - reading the pressure in said sealed portion of said pneumatic conduit a third time;
  - determining if said third pressure reading is more than a predetermined amount below said target inflation pressure; and
  - if said third pressure reading is more than said predetermined amount below said target inflation pressure, diagnosing said tire inflation system.

19. The method of inflating a tire of claim 1, wherein the step of performing a shut-down sequence once said predetermined target inflation pressure in said tire is reached includes the steps of:
- providing a controllable valve in fluid communication with said pneumatic conduit between said air supply source and said tire pressure retention valve;
- venting the portion of said pneumatic conduit between said controllable valve and said tire pressure retention valve;
- verifying the proper functioning of said tire pressure retention valve; and
- if pressure verification indicates said pressure retention valve is not properly functioning, sealing the portion of said pneumatic conduit between said controllable valve and said tire pressure retention valve.

20. The method of inflating a tire of claim 1, wherein the volume of at least one selected communicated air burst is related to a volume of a section of said conduit.

21. The method of inflating a tire of claim 20, wherein a determination of said volume of said at least one selected communicated air burst includes the steps of:
- calculating a pressure level with reference to said volume of said section of said conduit;
- taking a reading of a pressure in said section of said conduit;
- comparing said pressure reading to said calculated pressure level; and
- correlating an operation of a controllable valve to a result of said comparison.

* * * * *